(12) United States Patent
Bhunia et al.

(10) Patent No.: US 11,978,023 B2
(45) Date of Patent: May 7, 2024

(54) DRONE-BASED ADMINISTRATION OF REMOTELY LOCATED INSTRUMENTS AND GADGETS

(71) Applicant: University of Florida Research Foundation, Inc., Gainesville, FL (US)

(72) Inventors: Swarup Bhunia, Gainesville, FL (US); Prabuddha Chakraborty, Gainesville, FL (US); Reiner Dizon, Gainesville, FL (US); Parker Difuntorum, Gainesville, FL (US); Christopher Vega, Gainesville, FL (US); Patanjali Sristi Lakshmiprasanna Sriramakumara, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 225 days.

(21) Appl. No.: 17/467,823

(22) Filed: Sep. 7, 2021

(65) Prior Publication Data

US 2022/0083987 A1 Mar. 17, 2022

Related U.S. Application Data

(60) Provisional application No. 63/077,303, filed on Sep. 11, 2020.

(51) Int. Cl.
*G06Q 10/20* (2023.01)
*B64C 39/02* (2023.01)
(Continued)

(52) U.S. Cl.
CPC .......... *G06Q 10/20* (2013.01); *B64C 39/024* (2013.01); *B64D 47/08* (2013.01); *G05D 1/101* (2013.01);
(Continued)

(58) Field of Classification Search
CPC .... B64U 2101/30; B64U 50/19; G05D 1/101; B64D 47/08; B64C 39/024; G06N 20/00; G06Q 10/20
See application file for complete search history.

(56) References Cited

U.S. PATENT DOCUMENTS 9,421,869 B1 * 8/2016 Ananthanarayanan ...................... G05D 1/104
9,659,502 B1 * 5/2017 Abebe .................. G08G 5/0034
(Continued)

*Primary Examiner* — Courtney D Heinle
*Assistant Examiner* — Andrew Thanh Bui
(74) *Attorney, Agent, or Firm* — Thomas | Horstemeyer, LLP

(57) ABSTRACT

The present disclosure describes various embodiments of systems, apparatuses, and methods for drone-based administration of remotely located devices. One such method comprises deploying an unmanned aerial vehicle from a base station, wherein the base station assigns a maintenance order to the unmanned aerial vehicle for servicing of a remote device, traveling, by the unmanned aerial vehicle, to the location of the remote device, authenticating, by the unmanned aerial vehicle, a valid identification of the remote device; upon the remote device being authenticated by the unmanned aerial vehicle, servicing the remote device by at least charging a power supply of the remote device and transferring contents of a device log to the unmanned aerial vehicle; and after completing the servicing of the remote device; returning to the base station and transferring contents of the device log to the base station.

20 Claims, 20 Drawing Sheets

(51) Int. Cl.
  *B64D 47/08* (2006.01)
  *B64U 50/19* (2023.01)
  *B64U 101/30* (2023.01)
  *G05D 1/00* (2006.01)
  *G05D 1/10* (2006.01)
  *G06N 20/00* (2019.01)

(52) U.S. Cl.
  CPC .............. *G06N 20/00* (2019.01); *B64U 50/19* (2023.01); *B64U 2101/30* (2023.01)

(56) References Cited

U.S. PATENT DOCUMENTS

| | | | |
|---|---|---|---|
| 2018/0141453 A1* | 5/2018 | High | B60L 53/80 |
| 2018/0217382 A1* | 8/2018 | Urbach | G02B 27/0176 |
| 2019/0112048 A1* | 4/2019 | Culver | B64C 39/022 |
| 2022/0390964 A1* | 12/2022 | Youmans | B64C 39/024 |

\* cited by examiner

DRONE-BASED ADMINISTRATION OF REMOTELY LOCATED INSTRUMENTS AND GADGETS

CROSS-REFERENCE TO RELATED APPLICATION

This application claims priority to U.S. provisional application entitled, "Darling: Drone-Based Administration of Remotely Located Instruments and Gadgets," having Ser. No. 63/077,303, filed Sep. 11, 2020, which is entirely incorporated herein by reference.

BACKGROUND

The advent of Internet of Things (IoT) has seen the rise in the deployment of many low-cost devices for automating various tasks in our day-to-day life. These devices are portable owing to the fact that they are battery operated and thus can be placed virtually anywhere. For example, a battery-operated security camera could be placed at a strategic angle, thereby enabling better coverage of a property and thus enhancing the security of the property. Similarly, remote surveillance cameras could be used in national parks for monitoring poaching or illegal trespassing. However, the remote nature of these devices makes the maintenance of these devices an arduous task. Routine tasks such as replacing the battery, data-backup, and debugging of these remote devices are currently performed by humans. In the instance of remote monitoring for poaching, the person would have to navigate treacherous terrain to perform these tasks. Consequently, having a person service these target remote entities (e.g., devices) may pose an occupational and environmental hazard to them.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

The present disclosure describes various embodiments of systems, apparatuses, and methods for Drone-Based Administration of Remotely Located Instruments and Gadgets (DARLING). In various embodiments, DARLING provides a framework for assisting remote devices using an Unmanned Aerial Vehicle (UAV). In accordance with embodiments of the present disclosure, a DARLING architecture has three hardware components: the UAV, a base station which is responsible for housing the UAV during non-deployment, and remote devices which the UAV services. The present disclosure describes various aspects of the base station and the UAVs in order to carry out a remote maintenance procedure. Whenever it is unsafe for the UAV to land near the remote device, in various embodiments of the present disclosure, the UAV can deploy a Detachable Charging Unit (DCU) having a platform that carries a battery pack and connects to the remote device for charging while the UAV services another device. Different types of maintenance can be performed based on a schedule or unexpected issues discovered by artificial intelligence (AI) models in either of the base station or the UAVs, in various embodiments. Most maintenance tasks are referred to as regular maintenance, where standard servicing procedures occur, such as charging and data transfer. Additionally, in various embodiments, DARLING can also anticipate future issues at the base station based on the collected diagnostic information from the remote device via the UAV through predictive maintenance. For example, if the UAV predicts or discovers an issue on the remote device, the UAV can perform targeted maintenance on the remote device. Correspondingly, the present disclosure considers various use cases, such as (a) an IoT device that is in a remote location and (b) an IoT device that is in an inconvenient location—and demonstrates the role of DARLING in these scenarios.

Figure 1:
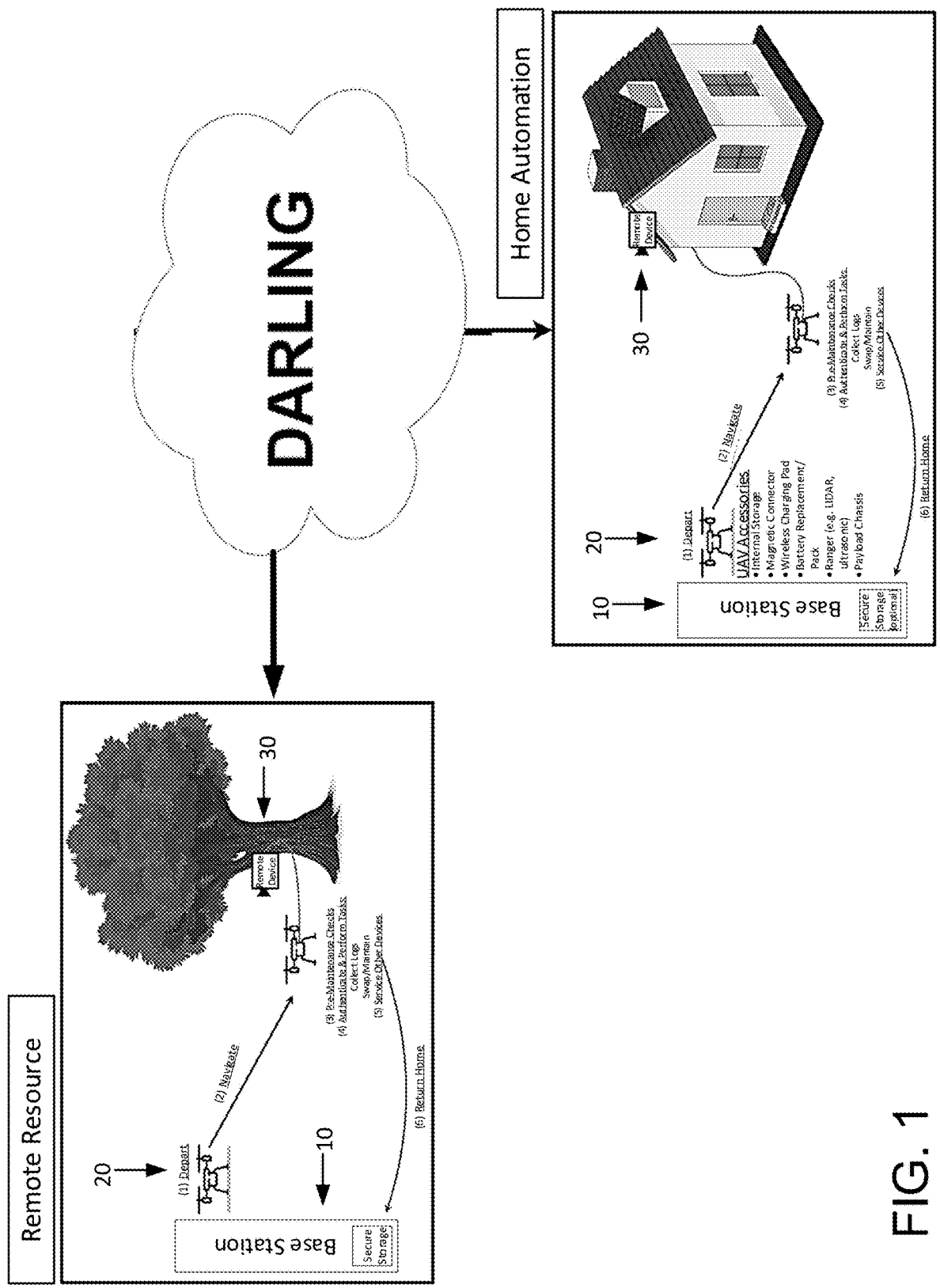
FIG. 1 shows a high-level overview of the an exemplary system for drone-based administration of remotely located instruments and gadgets (DARLING) for servicing multiple use cases involving a remote resource and home automation, in accordance with various embodiments of the present disclosure.

FIG. 1 displays a high-level overview of an exemplary embodiment of the DARLING framework that contains three main components: (1) a base station 10; (2) unmanned aerial vehicles (UAVs) 20; and (3) remote devices 30. The UAVs are the central components of DARLING and are equipped with the capabilities to navigate and perform a remote maintenance task on a remote device 30. In addition to the UAVs 20 and the remote devices 30, DARLING also has the base-station 10 which is used to house the idle (unspent or charging) UAVs 20. The base station 10 additionally has the capabilities to interact with the UAVs 20 for guidance and monitoring purposes, in various embodiments. In general, a base station 10 acts as a headquarter and charging station for the UAVs 20 in between servicing periods.

As compared to the state-of-the-art, the DARLING system enables secure, reliable, and seamless monitoring and maintenance of remote devices 30. In various embodiments, the DARLING system includes (a) a fleet of unmanned aerial vehicles (UAVs) 20 configured to perform maintenance tasks on remote devices 30 and (b) a base station 10 that is configured to serve as the UAV headquarters and command central.

In various embodiments, an exemplary design for the unmanned aerial vehicles 20 incorporates a detachable charging unit (DCU) that allows the charging of a device while the UAV 20 services other remote devices 30. Accordingly, an exemplary UAV 20 can perform remote maintenance tasks under a variety of use cases. For example, in the case of remote resource monitoring, remote devices 30 may be deployed in remote, hard-to-access locations that require maintenance operations like battery-replacement, data-backup, debug, and in some cases emergency tamper detection. Such remote devices 30 may have no Internet connection and may require periodic monitoring. Examples include a remote surveillance camera in the forest or a buoy with weather tracking sensors in the middle of the ocean. Another case is home automation, in which remote devices 30 may be deployed in residential homes which require periodic maintenance such as surveillance cameras. For such use cases, in addition to the maintenance tasks, the UAVs 20 may also act as a portable router that helps these remote devices 30 connect to the internet for firmware upgrades and backup. The UAVs 20 can also help in optimal positioning of these devices 30 for ensuring maximum efficiency. For example, surveillance cameras are often positioned such that they are accessible to a human but these locations might not be optimal from a coverage point-of-view. Using an UAV 20, in accordance with various embodiments of the present disclosure, would relax the accessibility constraint thereby efficiently positioning the UAVs 20.

In various embodiments, interactions between the UAV 20, the remote device 30, and the base station 10 are secured using authentication mechanisms in the DARLING framework to validate the interactions between the UAVs 20 and the remote devices 30 which helps in monitoring for tampering of the devices 30. The inclusion of a predictive maintenance mechanism in an exemplary embodiment of the DARLING system, including an AI Predictive Maintenance Unit in the base station's computing hardware, can anticipate future issues for remote devices 30 and creates fixes that the base station 10 can roll out at an appropriate time. Accordingly, the use of machine learning models, such as Big-Little Deep Neural Networks (BL-DNN), of different power and computational capabilities on both the base station 10 and the UAV 20 can aid in anticipating future issues and confirming detected problems encountered during regular maintenance.

Regarding communication capabilities, in various embodiments, there is UAV-to-base station communication, in which an exemplary base station 10 is capable of connecting to the Internet to retrieve software upgrades for the remote device 30. Additionally, in various use cases, the UAV 20 and/or the remote device 30 may also have the capability to connect to the Internet. In such cases, the UAV 10 and the remote device 30 may enlist cloud-based services, such as cloud-based authentication.

Figure 2:
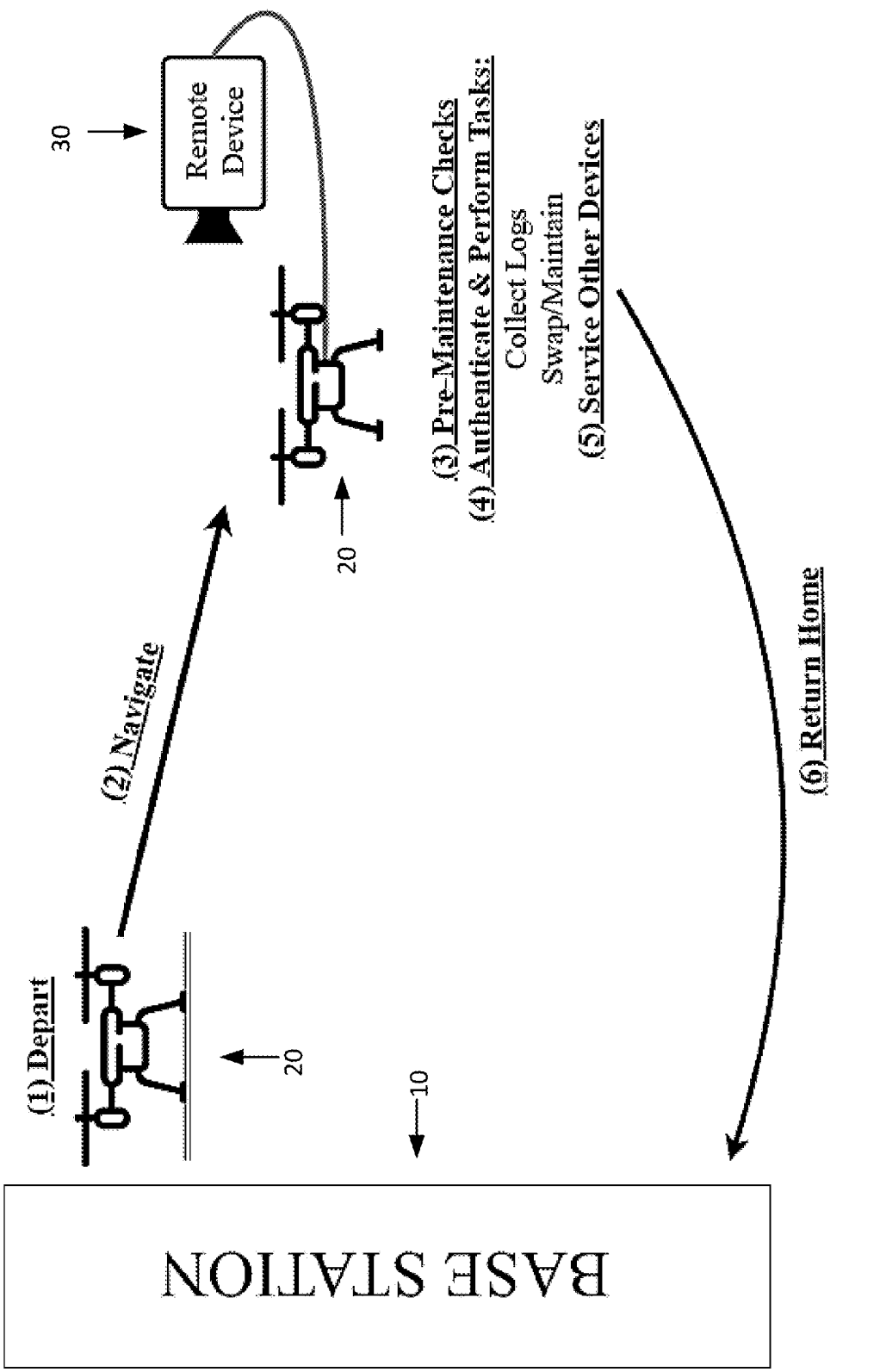
FIG. 2 shows a general architecture of an exemplary DARLING system in accordance with various embodiments of the present disclosure.

FIG. 2 summarizes the general architecture for an exemplary DARLING system, which has three principal components: 1) a base station 10, 2) unmanned aerial vehicles (UAVs) 20, and 3) remote devices 30. In various embodiments, the UAVs 20 can service the remote devices 30 by charging their batteries, moving and clearing data from their storage, and other maintenance tasks. The first two maintenance tasks may be considered as part of the regular maintenance of these devices 30. While the primary focus of this technology is the first two, the UAVs 20 can perform other servicing procedures, such as correcting the remote device's physical placement, recalibrating the remote device's internal sensors or itself, physically cleaning the exterior, debugging hardware (HW) and/or software (SW) features on the field, and bringing replacement parts to the remote device 30 or its components if replacements are necessary. These primary and additional tasks can occur out of a regular schedule as the base station 10 deems it necessary using a predictive maintenance AI model. In essence, the base station 10 serves as the UAV headquarters, which can assign maintenance orders to the UAVs 20 for the remote devices 30. Thus, the UAVs 20 can perform the bulk of the maintenance work on the remote device 30 in the present disclosure as the UAV 20 physically travels to the remote device 30 for servicing.

In various embodiments, the base station 10 makes the high level decision in determining appropriate maintenance tasks for the UAVs 20 to perform on certain devices 30 in an appropriate time frame. As the base station 10 serves as the home for the UAVs 20 in between servicing periods, the base station 10 will have charging stations for the UAV 20 to recharge batteries and a secure storage module 50 (FIG. 3) to transfer data from devices. In order to perform their tasks effectively, in various embodiments, the UAVs 20 are equipped with a camera, retractable robot arms with an optional drill, cable connectors, edge artificial intelligence (AI) unit, GPS, and batteries. Depending on environmental factors, the UAVs 20 can be additionally equipped with a detachable charging unit (DCU) platform, hooks/carabiners, ropes, suction cups, vacuum pump, and screwable collar loop. These additional parts makes it possible for the UAV 20 to charge a device where a safe landing zone is not feasible. These parts also ensure modifications to the remote devices 30 are not needed, especially when these changes involve having a person travel to the device's remote and/or inconvenient location.

An exemplary non-limiting general maintenance procedure begins with the base station 10 issuing maintenance instructions to the UAVs 20 along with relevant information about the remote devices 30 they will service. The base station 10 will provide more information about the remote device 30 and its general vicinity if it has been previously serviced. Otherwise, the general location and some basic information about the remote device 30 are provided to the UAV 20. The UAV 20 will use this location information and self-navigate to the general area of the remote device 30. As the UAV 20 approaches this location, the UAV 20 will either use firsthand knowledge about the remote device's environment or gather information using its camera and communicate with the remote device 30 itself to determine the proper maintenance configuration. Afterwards, the UAV 20 will perform pre-maintenance routines to check the health of the remote device 330 as well as authenticate the communication between the UAV 20 and the remote device 30. If successful, maintenance begins and, depending on the maintenance configuration, the UAV 20 may leave the current location to service another device while the current one charges. After completing maintenance of this device, the UAV 20 will continue servicing other remote devices 30 and return to the base station 10 after all of the remote devices 30 finish to charge its own batteries and transfer data to the secure storage. This procedure can repeat periodically for scheduled maintenance or as needed for emergency repairs.

Figure 3:
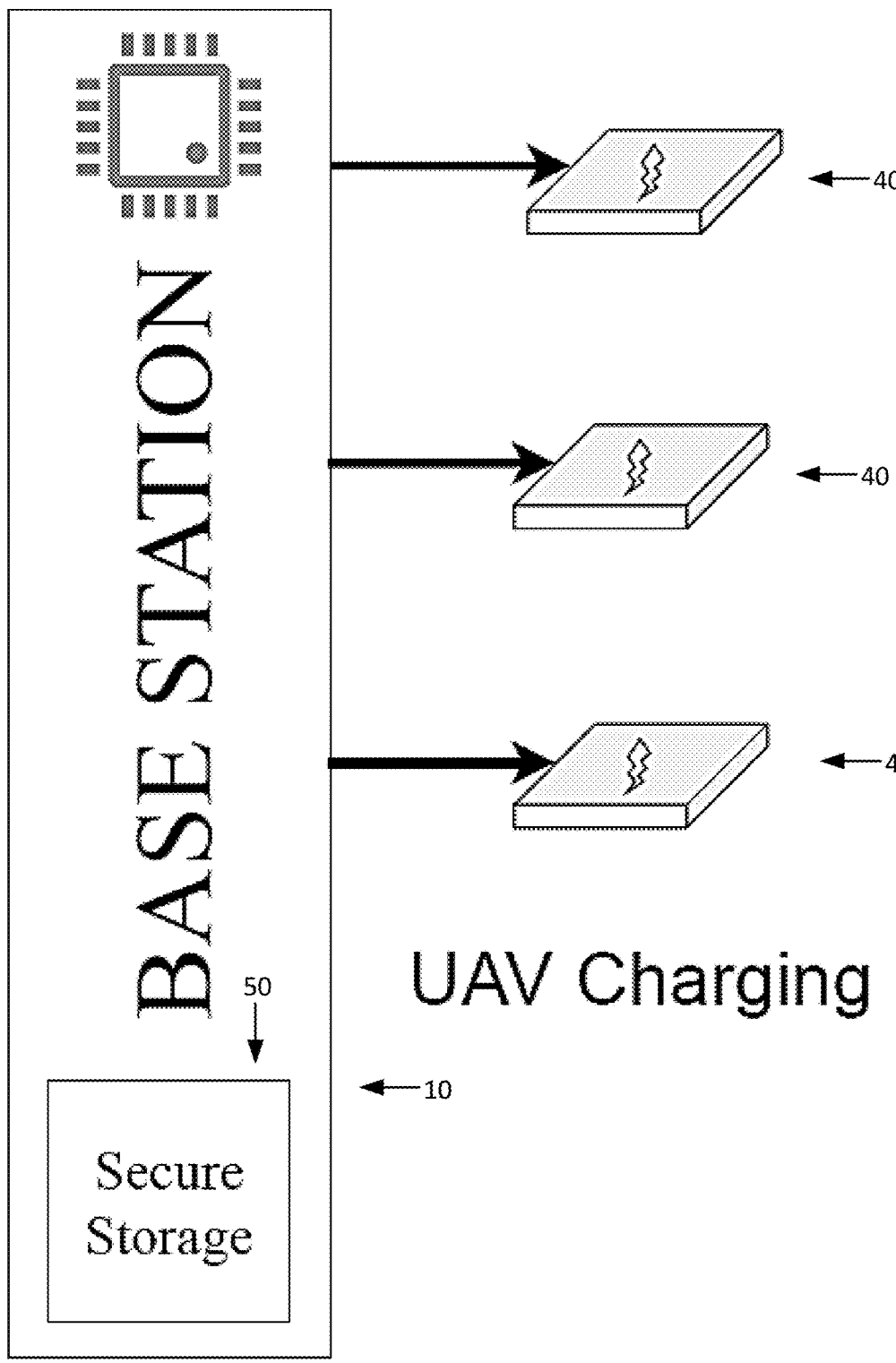
FIG. 3 shows component parts of an exemplary base station in accordance with various embodiments of the present disclosure.

Referring back to FIG. 2, the base station 10 acts as a centralized hub for the UAVs 20 as well as a main data center of all the remote devices 30. Since charging is a major maintenance task for the UAVs 20, the base station 10 can come equipped with charging stations for not only their batteries but also battery packs 40 for charging the devices 30 they service, as shown in FIG. 3. Another important task of data transfers requires the base station 10 to have a secure storage module 50 (as shown in FIG. 3) to collect the data from the remote device 30 for analyzing the sensor information as well as improve future maintenance by processing diagnostics data from the remote devices 30. Using the collected data, the base station 10 can employ an AI computing unit, such as using the "Big" portion of a two-part Big Little Deep Neural Network (BL-DNN). Such an AI unit can feature a powerful processor (e.g., CPUs and GPUs) in the base station's computer(s). These parts make the operation of the base station 10 as a delegator and data collection center very efficient.

Figure 4:
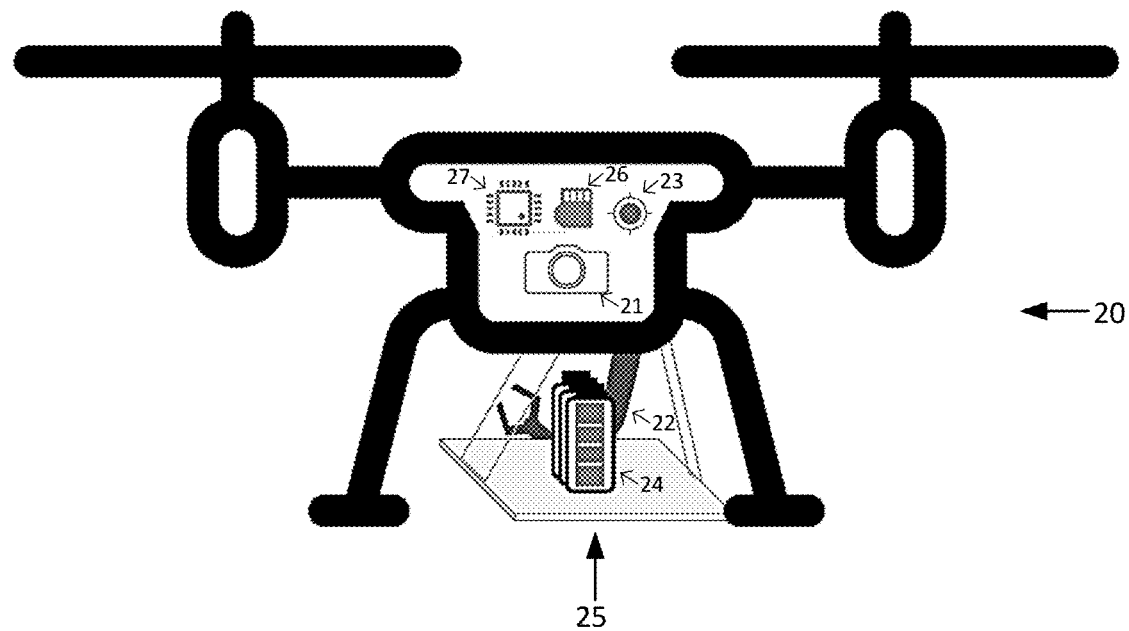
FIG. 4 shows component parts of an exemplary unmanned aerial vehicle (UAV) in accordance with various embodiments of the present disclosure.

Next, FIG. 4 shows component parts for the UAV 20. At a minimum, the UAV 20 (with a payload carrier 25) can be equipped with a camera 21; a retractable robotic arm 22; cable connectors; a ranger/tracker unit 23 (e.g., GPS (global positioning system) and LIDAR (light detection and ranging)); batteries 24, storage media 26, and a processor 27 with an edge AI unit and a wireless transmitter/receiver module. Such parts allow the UAV 20 to service a remote device 30 as long as there is a safe landing zone for the UAV 20 to stay in place during the maintenance procedure. The camera 21 gives visual feedback for navigating through obstacles, finding the remote device 30 in the prescribed location, and coordinating the retractable arm 22, akin to the human eye guiding the arm as it grabs objects. The retractable arm 22 enables the UAV 20 to move objects between its payload chassis 25 and the remote device 30. The cable connectors provide the physical communication media between the UAV's processor 27 and the remote device's processor as well as from the DCU's battery pack to the remote device 30. To aid the UAV's self-navigation algorithm, the UAV receives feedback from a ranger or tracker unit 23, such as a global positioning system (GPS) and Light Detection and Ranging (LIDAR) to locate itself during flight. An important payload in the UAV 20 for this technology are the battery packs 24 and the storage media 60 which will extend the longevity of the remote device 30 as the UAV 20 replenish its power and data resources. At the heart of controlling all these parts is a processor 27 with edge AI computing capabilities. This processor 27 can make some predictions about possible faults in the device based on collected diagnostic information. In order to communicate with nearby servicing UAVs 20 and remote devices 30 at an area, the wireless transmitter and receiver modules enable the UAVs 20 to determine if other devices nearby require targeted maintenance. All in all, these parts constitute the basic requirements for a UAV 20 in an exemplary embodiment of the DARLING framework.

Figure 5:
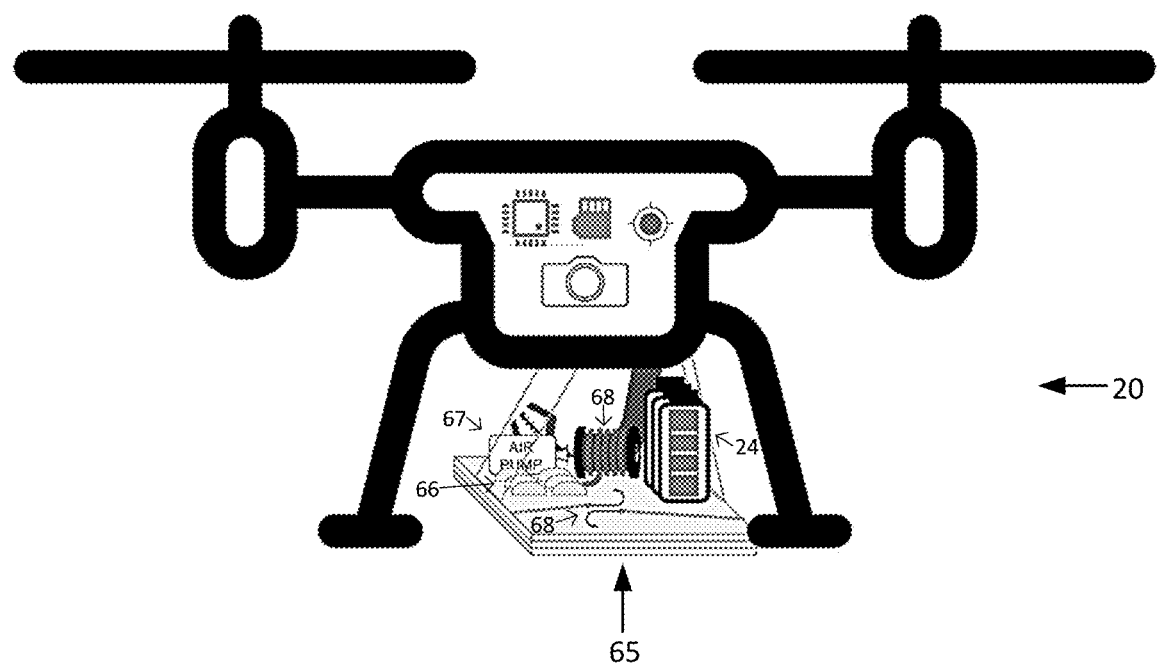
FIG. 5 shows component parts of an exemplary UAV with a detachable control unit (DCU) in accordance with various embodiments of the present disclosure.

An extension to the basic UAV hardware is the detachable charging unit (DCU), which is utilized when there is no safe landing zone around the remote device 30 for the UAV. Given this scenario, the purpose of the DCU is to charge the remote device 30 without needing the UAV 20 to land. Accordingly, the DCU platform unit lets the UAV 20 service other remote devices 30 while the DCU charges the remote device 30. In accordance with various embodiments, FIG. 5 shows an exemplary UAV 20 with a DCU platform 65 having additional parts that make up the DCU 65, which includes suction cups 66; vacuum pump 67; hooks/carabiners 68; support ropes 69; electric drill; collar loop; and magnetic platforms. The suction cups 66 of the DCU platform help to hold the DCU 65 in place by sticking to smooth surfaces. A vacuum pump 67 can also pull air in and out of the cup to remove and stick the suction cup 66 onto a surface, respectively. When there is a surface/area to which the DCU 65 can latch onto, the DCU 65 can use hooks/carabiners 68, and support ropes 69 to attach or hang the DCU 65 during the charging process. The DCU 65 can also use an electric drill to puncture holes into surfaces that the DCU 65 cannot latch onto and create an attachment point for a collar loop to which the DCU 65 along with hooks, carabiners, and support ropes. With all these means of attaching the DCU 65, the DCU 65 holds the battery pack 24 using a magnetic platform which keeps the battery pack 24 in place as well as itself onto attachment configurations, such as with suction cups 66. Except for the DCU platforms, any combination of the parts to attach the DCU is contingent upon the local environmental information around the remote device.

Figure 6:
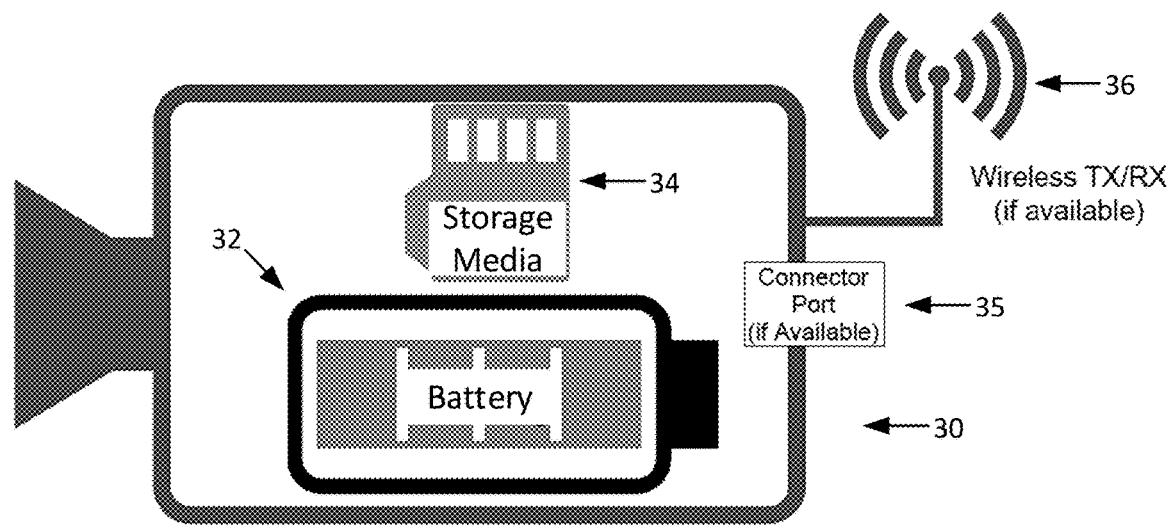
FIG. 6 shows component parts of an exemplary serviceable remote device in accordance with various embodiments of the present disclosure.

FIG. 6 shows component parts for a serviceable remote device 30. Since the primary maintenance tasks of the UAVs 20 are to replenish power and data resources, the remote devices 30 to be serviced should be equipped with a battery 32 (removable or internal); a storage medium 34 (e.g., SD card, hard disk drive, solid state drive, etc.); a connection port 35 (if applicable); and a wireless transmitter/receiver 36 (if applicable).

Based on the type of remote device 30, the UAV 20 will handle removable and internal batteries and storage media in distinct ways. Removable components are, of course, conducive to quicker maintenance as swapping out these components takes a shorter time compared to charging the battery and transferring files onto the storage media on the UAV 20. These basic components are necessary on the remote devices 30 for a UAV 20 in the DARLING framework to service them properly.

When there is a connection port 35 on the remote device 30, the port allows the UAV 20 to collect device information and diagnostic data for predictive maintenance. Depending on the AI model's prediction on the UAV 20, the retrieved data help inform the UAV 20 and the base station 10 of pending problems. The latter of these will prompt the base station 10 to perform targeted maintenance on this particular device 30. If this targeted maintenance also applies to devices 30 of the same type, the base station 10 will deploy UAVs 20 to service affected devices 30 once more to address the discovered issue.

The addition of a wireless transmitter and receiver 36 enables the remote device 30 to relay their own problems or problems of other nearby devices 30 to servicing UAVs 20, thereby improving coverage for targeted maintenance and addressing affected devices 30 quickly rather than waiting for the next regular maintenance schedule. This part can use any wireless communication standard, such as Wi-Fi, Bluetooth, and Zigbee. Fly by UAVs 20 can also detect the wireless signals in order to take notes of which devices 30 require attention along their maintenance route. Such parts improve the capabilities of the DARLING system in addressing device issues as quickly as they occur in the network.

Along with the hardware parts, the base station 10 and the UAVs 20 have their corresponding software units and constructs that allow each component to make their own decisions regarding the maintenance scenarios, in various embodiments. An exemplary DARLING framework handles different types of maintenance based on a schedule or unexpected issues determined by an AI model both in the long-term and in the immediate future, such as Regular Maintenance—based on a predetermined schedule stored in a database; Predictive Maintenance—based on long-term issues detected by a base station's AI model; and Targeted Maintenance—based on short-term issues detected by UAV's and a base station's AI model.

Figure 7:
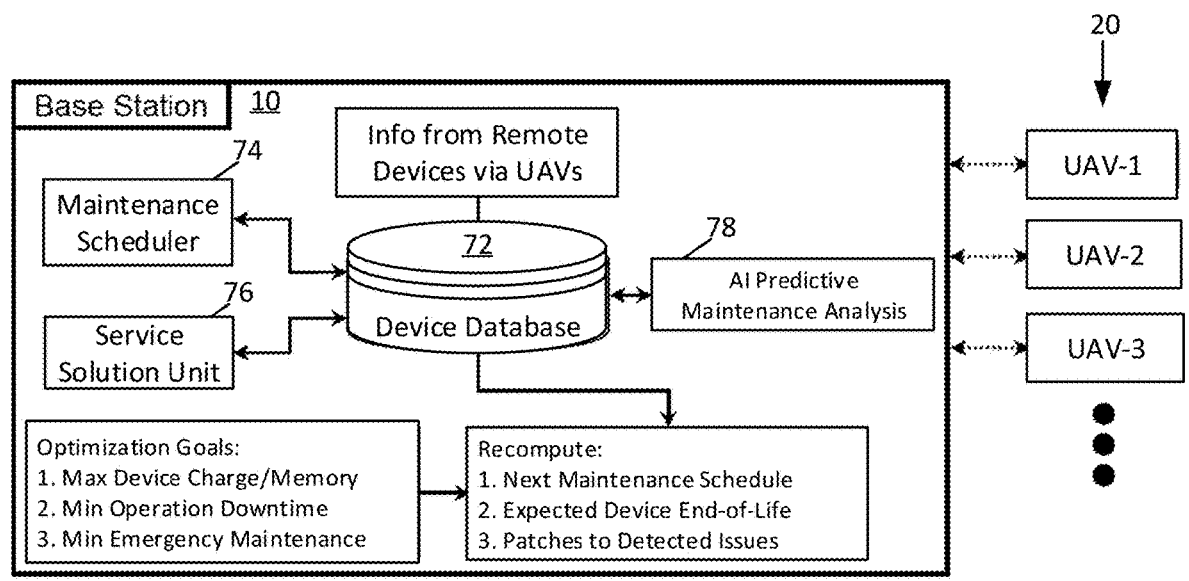
FIG. 7 shows software units for an exemplary base station in accordance with various embodiments of the present disclosure.

As shown in FIG. 7, an exemplary base station 10 can have the following software units and constructs on its computing system: a device database 72, a maintenance scheduler 74, a service solution unit 76, and an AI predictive maintenance unit 78. For example, the device database 72 can be configured to keep track of device information for the UAV 20 as well as help other software units to make high-level decisions for the system which includes, but is not limited to, the following information: device identification (ID) and type, location information (e.g. coordinates, nearby environment), available software/firmware (SW/FW) updates (e.g., utilizes Internet connection), next estimated maintenance schedule, expected end of life; and previous device issues.

The maintenance scheduler 74 can be configured to dispatch and give instructions to the UAVs 20 to service a set of remote devices 30 based on a timetable provided by the device database 72 or the AI predictive maintenance unit 78, whereas the service solution unit 76 can be configured to recommend fixes, patches, or SW/FW upgrades to resolve problems found by the predictive maintenance unit or during recent maintenance using diagnostic information and predicted/discovered issue. The AI predictive maintenance unit 78 can be configured to perform predictive analysis on collected diagnostic information from the remote devices 30 via the UAVs 20. At the heart of the AI predictive maintenance unit 78 is a machine learning algorithm, such as the Big portion of the Big Little Deep Neural Network (BL-DNN), which also considers environmental and weather data in its model to handle issues at an appropriate time.

Figure 8:
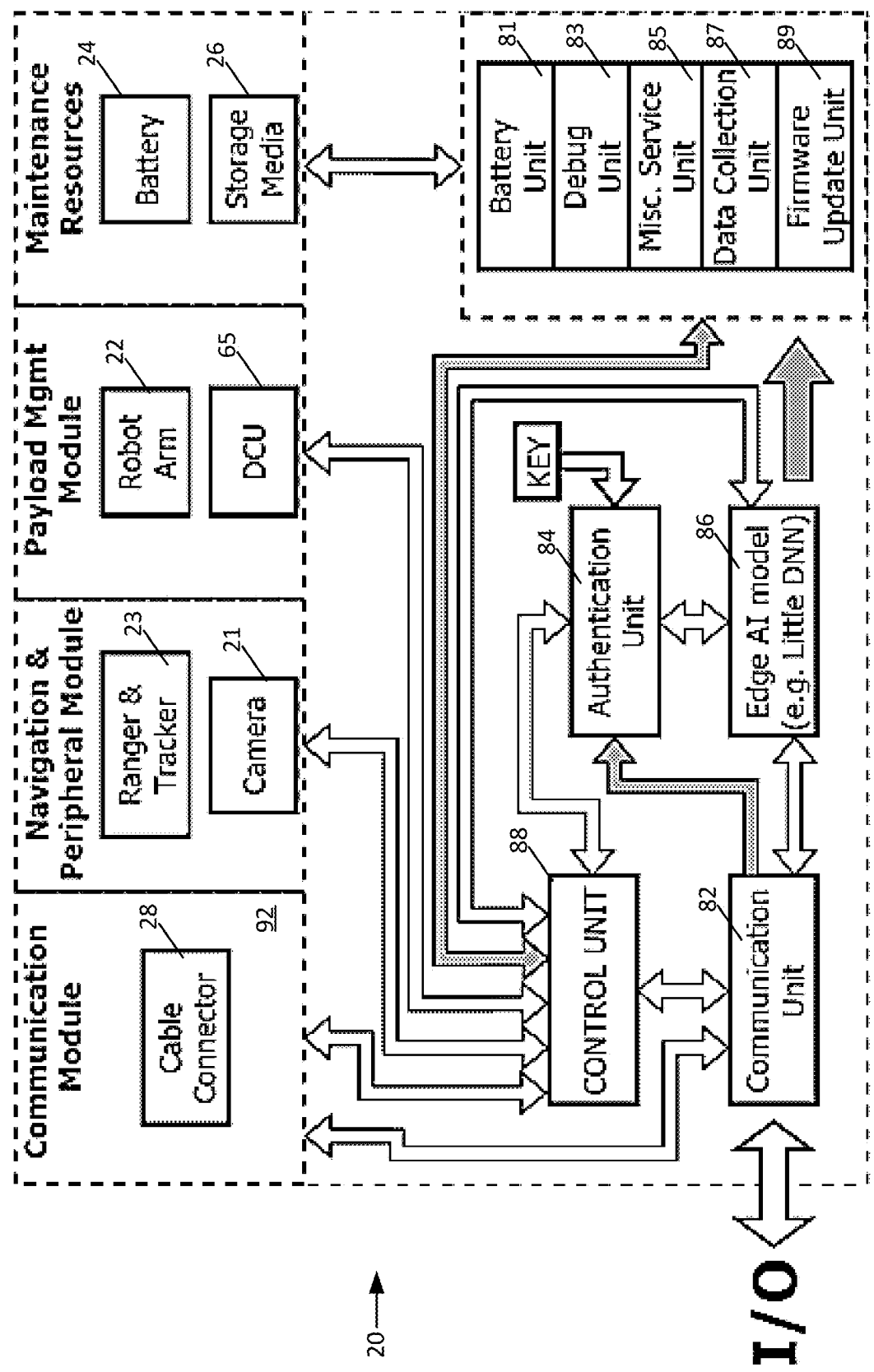
FIG. 8 shows a block diagram of an exemplary UAV in accordance with various embodiments of the present disclosure.

Referring now to FIG. 8, an exemplary servicing unmanned aerial vehicle 20 can have various software units on its computing system and their corresponding hardware parts. For example, a communication unit 82 (bottom left of FIG. 8) can be configured to establish the communication between the UAV 20 and all other components in the framework using the communication module 92, in which the communication module 92 contains a cable connector 28 that attaches to a connection port on the remote device 30 and the base station 10. An authentication unit 84 can be configured to validate the communication with the remote device 30 given the authentication mechanism. If someone has tampered with the remote device 30, this is one of the software units responsible for alerting the UAV 20 of tampering. The UAV 20 will use the communication module 92 to transmit and receive an authentication secret to/from the remote device 30, and the pre-programmed key and encryption algorithm also support this authentication unit 84. An edge AI model unit 86 (that performs predictive and targeted maintenance services), such as Little DNN of BL-DNN, can be configured to diagnose power or data issues on the fly and instruct the control unit 88 of the UAV 20 on whether to proceed with the regular maintenance tasks. The battery unit 81 can be configured to perform associated current/voltage transformation and charge monitoring of the battery module; and the debug unit 83 can be configured to collect the device log and perform debugging tasks given by the base station 10 based on previous flights to the remote device 30. Additionally, a miscellaneous service unit 85 can be configured for various other administrative services on these devices, e.g., troubleshooting of a failed device or bringing a failed device back to service center and replacing it with another device, etc.; a data collection unit 87 can be configured to retrieve data stored on the remote device 30, which will also free up memory from the remote device 30; and a firmware update unit 89 can be configured to perform software and firmware upgrades on the remote device 30 if the base station 10 generates or downloads a new update to the UAV for the remote device 30. An exemplary control unit 88 can be configured for system administration and navigation which can be programmed to do different system administration duties, and can also have the intelligence to decide on specific tasks (e.g., if a certain maintenance task is required for a device, then it can do it). Related to the UAV's navigation, the navigational module includes a ranger and/or tracker 23 (e.g., LIDAR, time-of-flight (TOF) sensor, and GPS). To interact with parts on the payload, the control unit 88 can be configured to actuate a retractable robot arm 22 to move items into or off the payload chassis 25. Depending on the application and the environment, the UAV 20 can be configured to carry not only a battery and storage medium but also a chassis for holding other equipment, such as the DCU 65.

Figure 9:
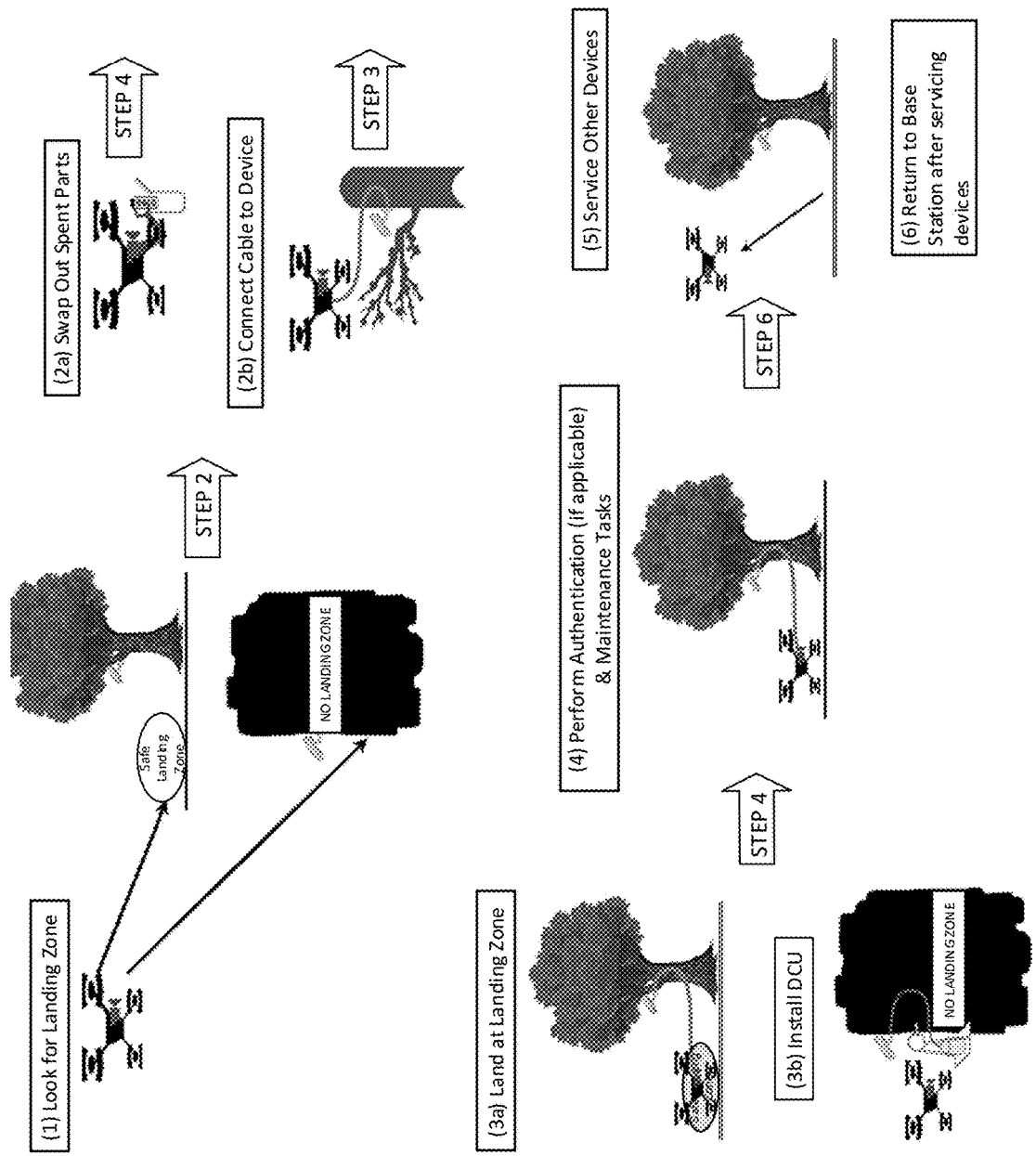
FIG. 9 shows a flow diagram of an exemplary maintenance procedure at a remote device in accordance with various embodiments of the present disclosure.

In accordance with various embodiments, during a regular maintenance task at a scheduled time, the UAV 20 is configured to receive instructions and device information from the base station 10. Given the location information, the UAV 20 will then navigate to the general area of the remote device 30. When it reaches this location, the maintenance procedure will proceed as illustrated in FIG. 9. Accordingly, if the UAV 20 is servicing the remote device 30 for the first time, the UAV 20 will first look for and store the location of a safe landing zone, an area where the UAV 20 can rest while performing its maintenance tasks near the remote device 30. Otherwise, the UAV 20 will use firsthand knowledge based on previous administrations of the remote device 30. Afterwards, using the camera 21, the UAV 20 will locate the remote device 30 as well as the connector port 35 if the remote device 30 equips it.

If there is no connector port 35, the UAV 20 will swap out the batteries 24 and the storage media 50 using the retractable robot arm 22 as well as the camera 21 as a visual feedback. Of course, the swapping operation will render the remote device 30 unavailable until the UAV 20 swaps all relevant parts. Afterwards, using the robot arm 22, the UAV 20 will turn on the remote device 30 if the device was powered off and will manually check the remote device configuration as well as record a video of the device for visual inspection at the base station 10 which will be the diagnostic information for that remote device 30.

If the remote device 30 has a connector port 35, the UAV will first enable the robot arm's actuator 22. The arm will grab one end of the connector (the one already connected to the UAV's computer) from the payload using its claw. It will then extend the cable to the device's connector port, line up the connectors, and plug in the cable into the port. Once connected, both the UAV 20 and the device 30 can perform their authentication protocols. If the authentication fails, the UAV 20 will detach the cable and take off to navigate to another device 30. Otherwise, the UAV 20 will begin to collect some diagnostic information for the edge AI unit and perform actions based on that output.

If the edge AI unit predicts some issues with the battery and/or the storage medium, the UAV 20 will not proceed with the regular maintenance procedure just yet. If the spent parts are removable, the robot arm(s) 22 can perform the swapping process if there are replacement parts are on the UAV 20. In situations where the parts are internal or there are no replacement parts, the UAV 20 will collect some more diagnostic information from the device 30 and immediately return to the base station 10 to process the issues right away.

If the remote device's condition is healthy, the UAV 20 will decide on whether to deploy the DCU 65 based on if a safe landing zone exists. If such a zone is found, the UAV 20 will land to that location, turn off its motors, and perform the maintenance procedure. Otherwise, the UAV 20 will first remove the cable connected from the remote device 30. If the base station 10 sent the UAV 20 some information about the environment where the remote device 30 is mounted, the UAV 20 will use this knowledge to decide how to deploy the DCU 65. Otherwise, the camera 21 will be used to determine the roughness and orientation of the surface where the remote device 30 is mounted for the first time. Afterwards, the UAV 20 will find a suitable location near the device to hang or mount the DCU 65 and hover there to begin the DCU deployment.

For different combinations of roughness and orientation, the UAV 20 may be configured to perform a variety of positioning or anchoring procedures for the DCU 65. To illustrate, for a rough, horizontal surface (e.g., tree branch), the UAV 20 may first perform a hook installation and an attachment of the DCU platform 65 to the hook installation; next, the UAV 20 will take off to service another device 30; once the UAV 20 returns back to the remote device 30 and charging is complete, the UAV 20 will remove the battery pack 24 off the DCU platform 65 followed by removing the DCU platform 65 using the robot arm 22 and replacing them back to the payload chassis; and then, the UAV 20 will perform hook removal.

Figure 10:
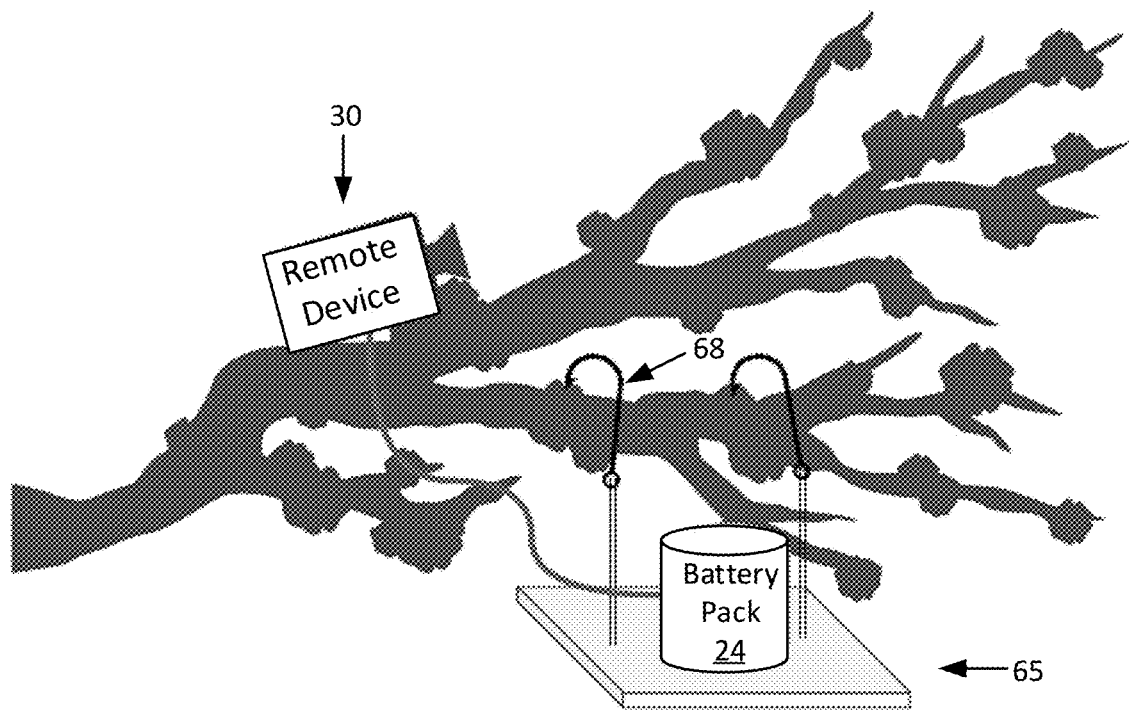
FIG. 10 shows a diagram representation of an exemplary DCU hanging off hooks on a horizontal surface in accordance with various embodiments of the present disclosure.

To install the hooks 68 for the DCU 65, as shown in FIG. 10, the robot arm 22 will hang the left hook first from the DCU 65 to the surface and do the same for the right hook. The arm 22 will grab onto the DCU platform 65 and release it from the bottom of the pile underneath the payload chassis. Afterwards, the UAV's robot arm 22 will load the battery pack 24 onto the magnetic portion of the platform using the claw. Finally, the arm will connect the cable connector from the DCU's battery pack to the device 30. To remove the hooks 68 from the surface, the process is reverse of the installation: disconnect the cable connector; dismount the battery pack 24; return the DCU platform 65; and detach the left and right hooks 68 from the surface.

For a smooth, horizontal OR vertical surface (e.g., railing, light pole), the UAV 20 may perform a suction cup installation procedure. After which, the UAV 20 will take off to service another device 30. Once the UAV 20 returns back to the remote device 30 and charging procedures are complete, the UAV 20 will remove the battery pack 24 off the DCU platform 65 followed by the DCU platform using the robotic arm 22 and replace them back to the payload chassis. Then, the UAV 20 will perform a suction cup removal.

Figure 11:
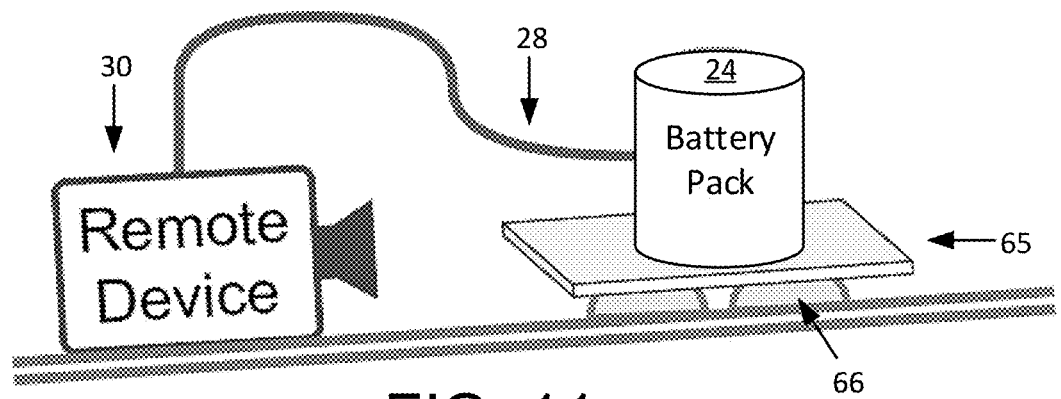
FIG. 11 shows a diagram representation of an exemplary DCU laying on suction cups in accordance with various embodiments of the present disclosure.
Figure 12:
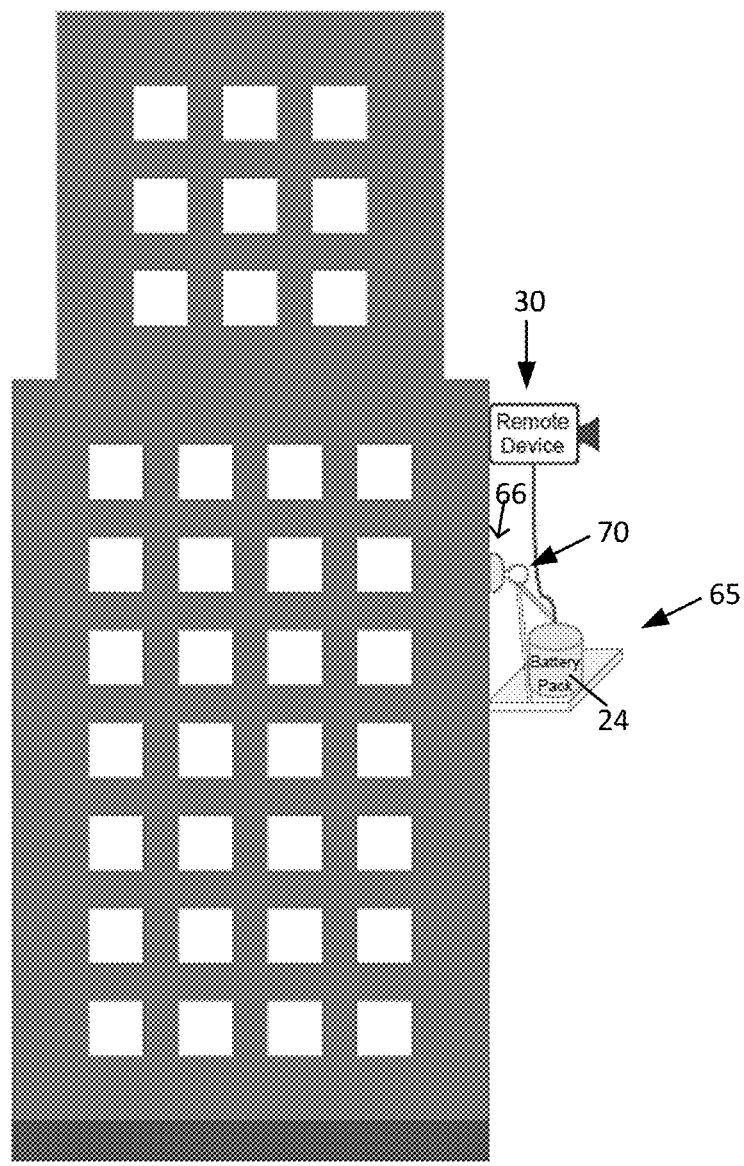
FIG. 12 shows a diagram representation of an exemplary DCU hanging off hooks attached on a collar loop connected to a suction cup in accordance with various embodiments of the present disclosure.

To install the suction cup(s) 66, in accordance with an exemplary installation procedure, as shown in FIG. 11, the arm 22 can connect the vacuum pump 67 onto one of the suction cups 66; position the suction cup 66 into the surface using the retractable claw 22; once completed, remove the pump connector; repeat the previous three steps for several suction cups 66 needed; place the DCU platform 65 onto the suction cup 66 using magnets on each component to secure the platform in place; place one of the battery packs 24 on the platform; and/or connect the cable connector 28 from it to the device 30. As needs arise, a collar loop 70 can be attached to a suction cup 66, in which the collar loop 70 is also fastened to the DCU platform 65, as demonstrated by FIG. 12.

To remove the suction cup(s) 66, the arm can perform the collar loop removal if there is a collar loop 70; reattach the tube from the vacuum pump 67 to the suction cup 66; release the suction cup 66 by adding air to it; return the suction cup 66 to the payload chassis; and repeat the last three steps for all the suction cups 66.

Correspondingly, for a rough, vertical surface (e.g., cliff), the UAV 20 can perform a collar loop drill installation where it can hang the DCU using hooks. After which, the UAV 20 will take off to service another device 30. Once the UAV 20 returns back to the device 30 and charging is complete, the UAV 20 can remove the battery pack 24 off the DCU platform 65 followed by the platform using the robotic arm 22 and replacing them back to the payload chassis. Then, the UAV will remove the hooks from the collar loop.

Figure 13:
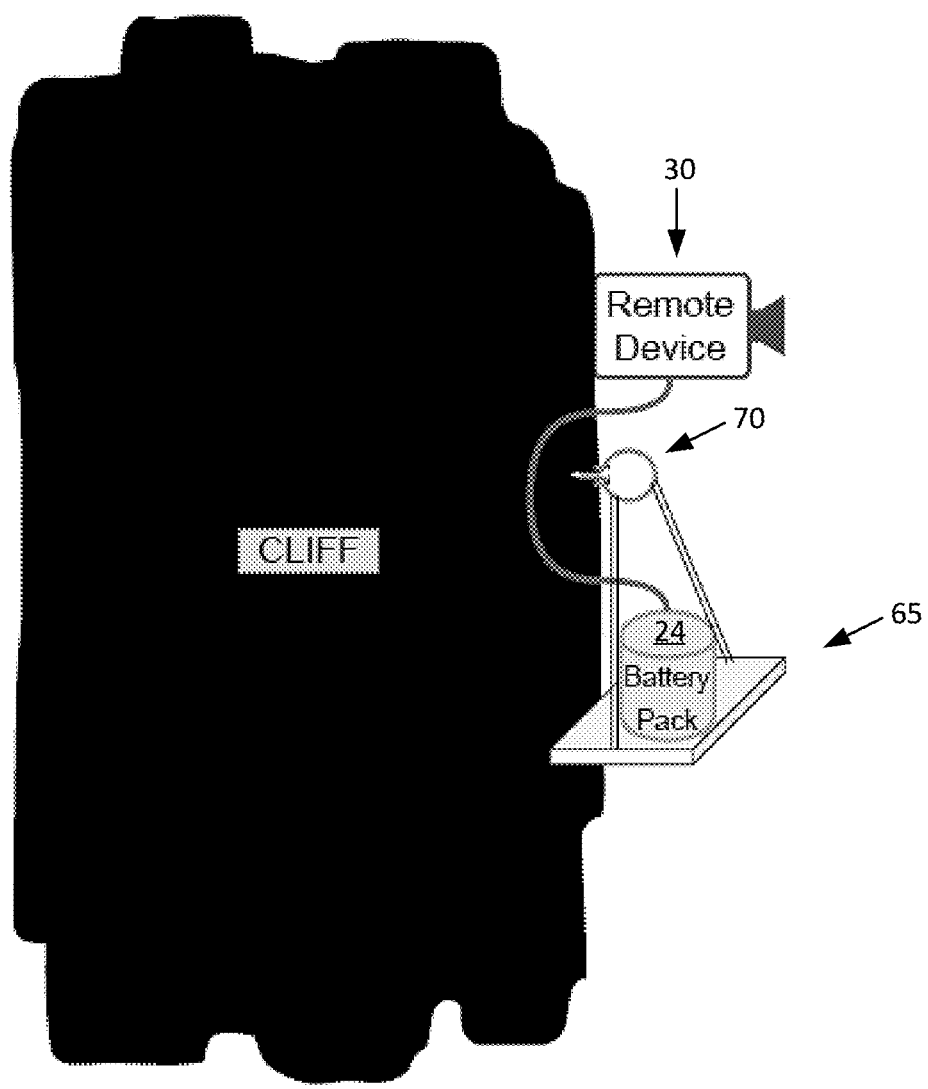
FIG. 13 shows a diagram representation of an exemplary DCU hanging off hooks attached on a collar loop drilled against a vertical surface in accordance with various embodiments of the present disclosure.

To install the collar loop, as shown in FIG. 13, for one embodiment, the arm 22 can look at the maximum area (based on length of shortest connectors) from the device 30 for existing holes or collar loops; if there are no holes, use the drill off the robotic arm 22 to drill a hole some distance away from the device 30; if there are no collar loop or tree steps after finding a hole, use drill to screw in a tree step or collar loop; once a collar loop/tree step is found or installed, attach the left hook from the DCU 65 to the collar loop; repeat for the right hook; once both are securely in place, release the DCU platform 65 off the UAV 20; and/or connect the charging cable 28 to the battery pack 24 and to the device 30.

To remove the hooks from the collar loop 70, the arm 22 can disconnect the cable connector 28; dismount the battery pack 24; return the DCU platform 65; and/or detach left and right hooks 68 from the surface.

In accordance with various embodiments, after the UAV 20 returns the DCU parts onto its payload, the UAV 20 may perform the remaining maintenance tasks, such as collecting data, freeing up memory, and performing updates, after the UAV 20 connects its data cable 28 back to the remote device 30 using the robotic arm 22. Then, after completing all regular maintenance tasks, the UAV 20 can disconnect the cable 28 from the remote device 30 and return the cable 28 to the payload chassis. At this point, the remote device 30 will be fully serviced, and the UAV 20 can service other devices 30 on its list of devices 30. Once all the remote devices 30 have been serviced, the UAV 20 can head back to the base station 30.

Figure 14:
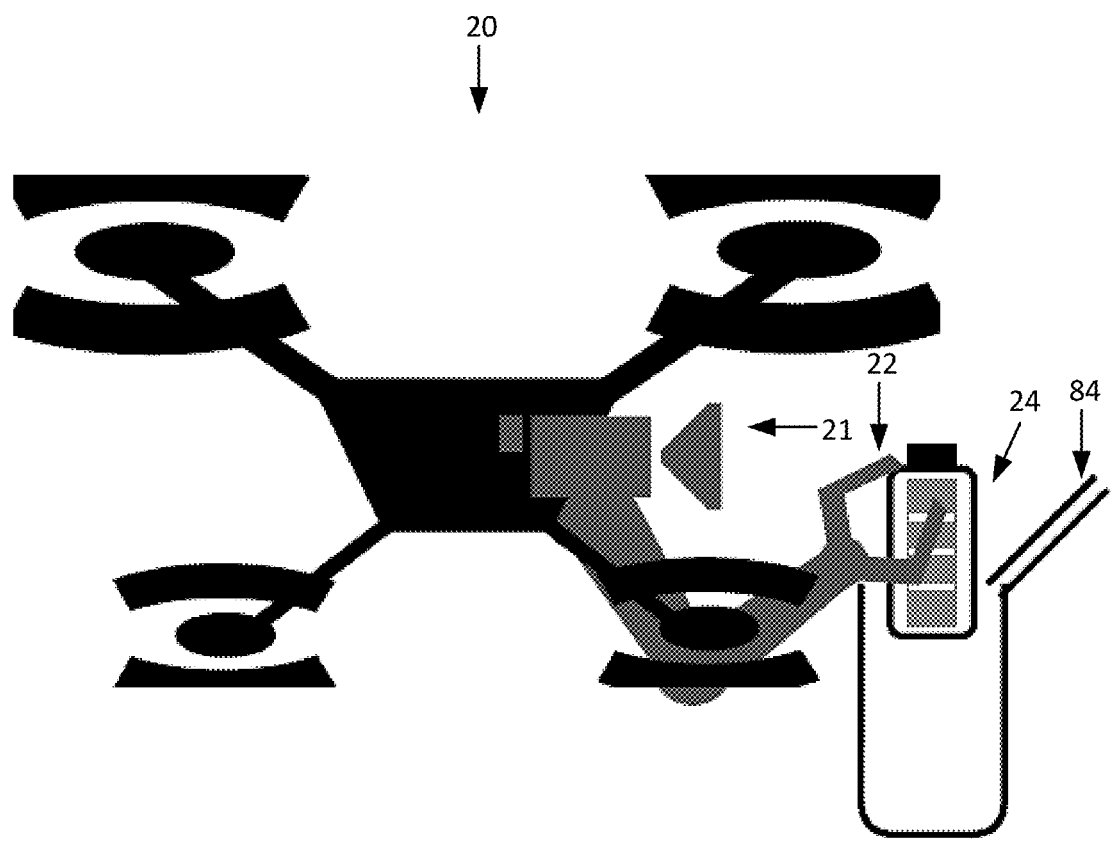
FIG. 14 shows a diagram representation of an exemplary UAV swapping out a battery at a remote device in accordance with various embodiments of the present disclosure.

In an exemplary embodiment, when the UAV 20 needs to swap out parts like batteries and storage media, the UAV 20 will first enable the actuators of the robot arm 22. As represented in FIG. 14, in one embodiment, the UAV 20 will look for the door 84 that secures the part(s) using the camera 21. Then, using the robot arm's claw 22, the UAV 20 will open the remote device's compartment (e.g., sliding the door or toggling a knob that opens the door). If there are additional tabs or doors that holds the part(s), the claw can push them to release the part(s), remove the spent part(s), and load them into the payload. The arm 22 can then grab a fresh part(s) from the payload, line them up on the compartment on the device 30, and push them in place. Afterwards, the arm 22 will close the door 84 (e.g., slide the compartment back in place or press the door down securely).

In order to authenticate the communications among the base station 10, the UAVs 20, and remote devices 30, authentication mechanisms are utilized to ensure the appropriate components are talking to each other. To illustrate, in an exemplary embodiment, once the UAV 20 lands on the remote device 30, authentication units on both components will run their corresponding algorithms based on these mechanisms before performing any maintenance tasks. In this way, the UAV 20 is not providing resources to a wrong device, especially when it is not part of the maintenance network. For example, an adversary may attempt to charge their remote devices 30 using a UAV 20 that is part of DARLING, essentially stealing power from the network. Moreover, if a legitimate device has been tampered, the authentication mechanism will fail, which the UAV 20 can note as an incident to the base station 10. Hence, these authentication mechanisms are paramount for the security of not only the UAVs 20 but also for the remote devices 30, in various embodiments.

Figure 15:
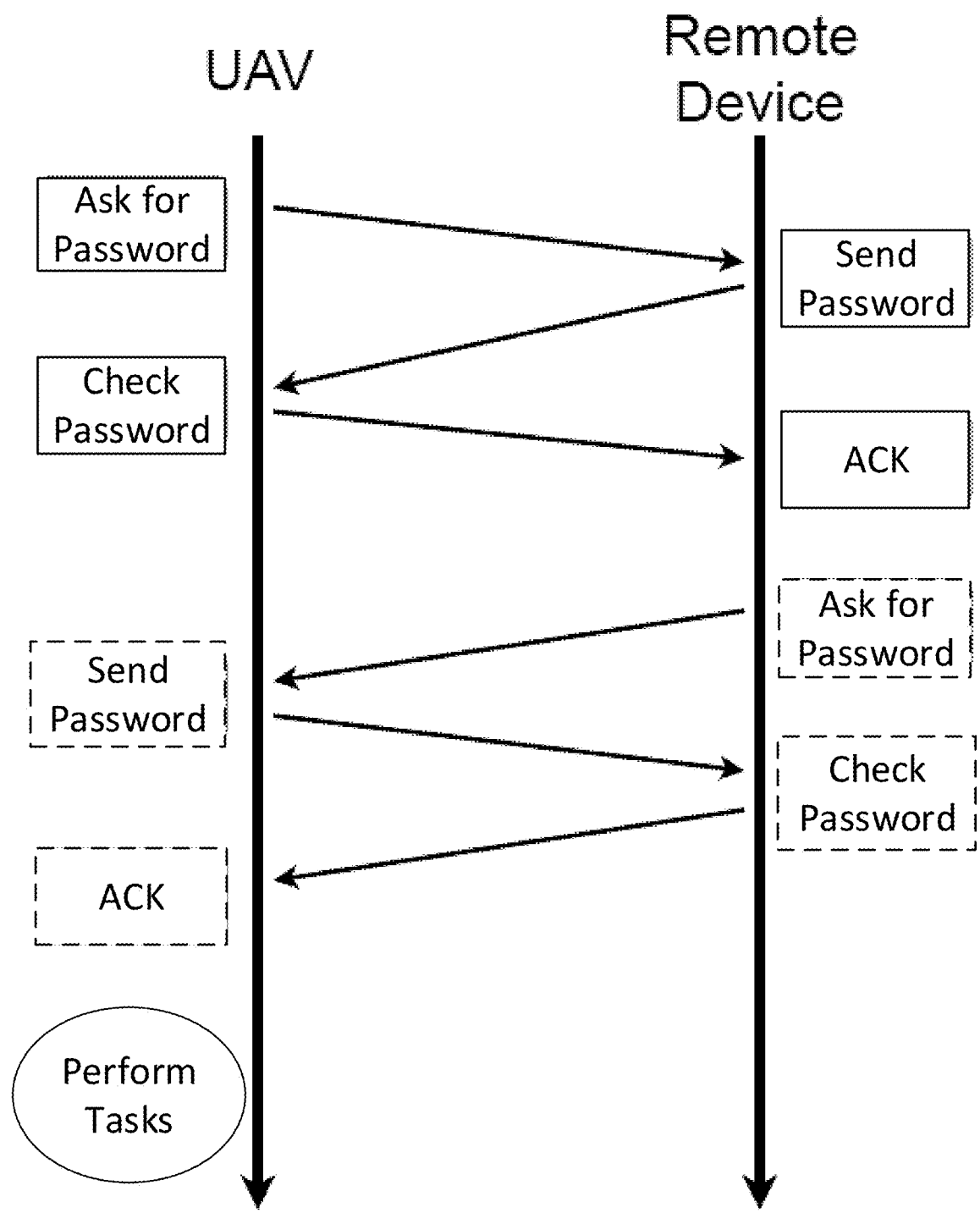
FIG. 15 shows an exemplary authentication key exchange diagram in accordance with various embodiments of the present disclosure.

FIG. 15 visualizes an exemplary key exchange protocol for authentication mechanisms in the DARLING framework, in accordance with embodiments of the present disclosure. Under the protocol, the UAV 20 will authenticate the remote device 30 as highlighted by the solid boxes in the figure. After landing onto the remote device 30, the UAV 20 will ask for password/key/challenge from the remote device 30. Once the remote device 30 sends the password, the UAV 20 will check the password and send the acknowledge (ACK) signal to the remote device 30. Afterwards, the remote device 30 will then authenticate the UAV 20 in the similar fashion as highlighted by the dashed boxes in the figure. Once this authentication succeeds, the UAV 20 is then allowed to perform maintenance tasks.

As part of the DARLING framework, variants for the authentication mechanisms can be deployed in various embodiments to protect the communication among the components. For example, a first variant uses a local encryption algorithm, such as AES and RSA, which exchanges pre-programmed keys. These keys can be locally stored in both the UAV 20 and the remote device 30 which is fed through their corresponding authentication units. The choice of algorithm is left to the end-user of the DARLING framework which determines the hardware overhead on each component.

A second variant takes advantage of the available Internet connection in both the UAV 20 and the remote device 30 and uses a cloud-based authentication mechanism. This scheme uses network-level encryption algorithms to exchange keys, which eliminates having a local encryption algorithm implemented on each component, reducing hardware overhead.

A third variant uses physical unclonable functions (PUFs) to authenticate the hardware between the components. Accordingly, in general, a physical unclonable function is a hardware security primitive that exploits process variations in the hardware of both components, which are due to the manufacturing process of each hardware and makes them unique from each other. Therefore, instead of exchanging passwords, the components will exchange challenges to each other's PUFs and check the responses. If the responses match from the stored secrets, the mechanism considers this a successful authentication. However, an unmatched response will not only signal unsuccessful authentication but also can signal some tampering on the remote device. Each of the above authentication mechanisms allows the components to interact securely with one another that are included in the maintenance network.

Figure 16:
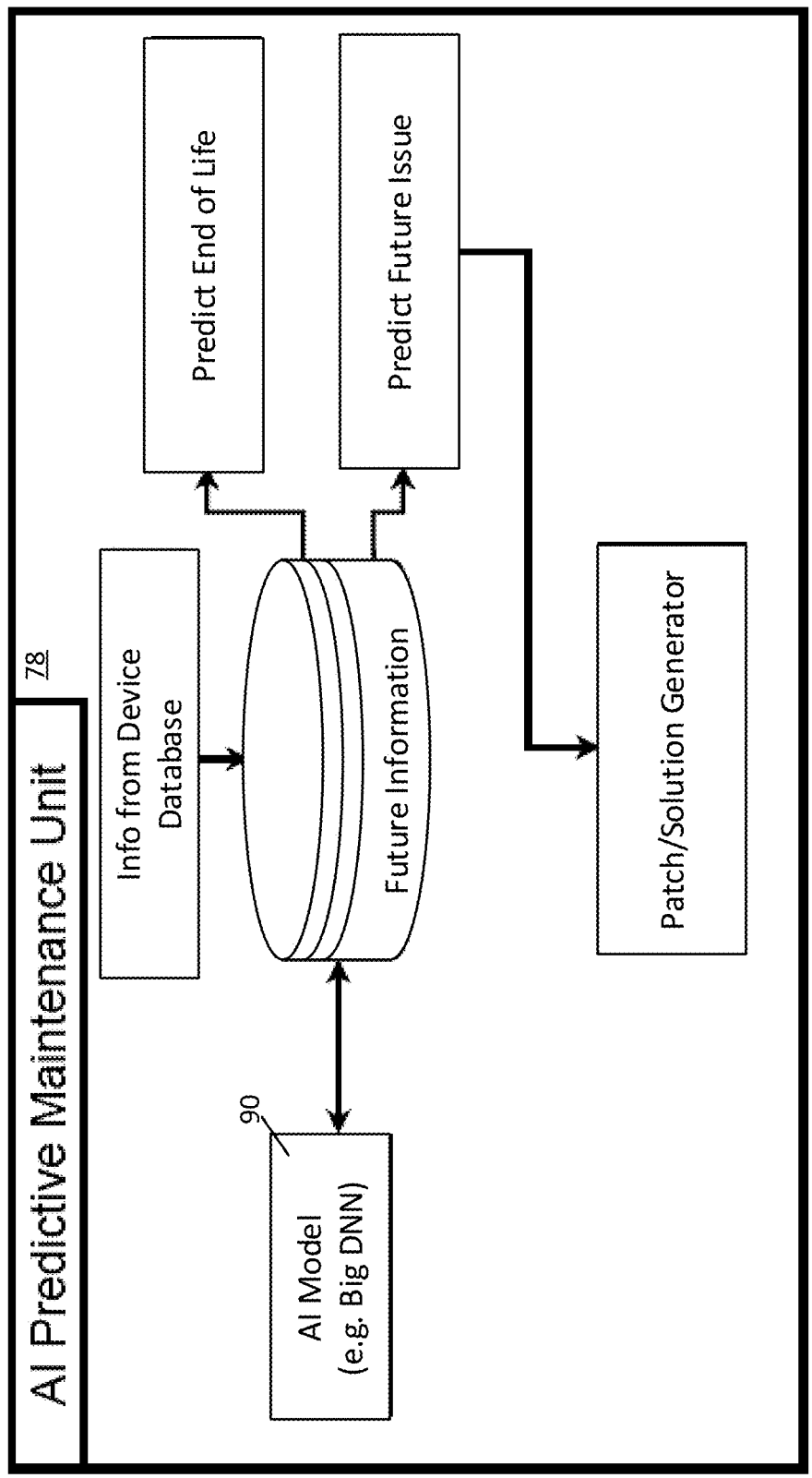
FIG. 16 shows a block diagram of an exemplary artificial intelligence (AI) predictive maintenance unit of a base station in accordance with various embodiments of the present disclosure.

In various embodiments, an exemplary DARLING system includes an AI Predictive Maintenance Unit in the base station's computing hardware that is configured to anticipate future issues that remote devices will encounter as well as process present device issues detected by the UAVs. Important elements of predictive maintenance are machine learning algorithms and the AI Predictive Maintenance Unit 78 in the base station 10, as shown in FIG. 16. The use of artificial intelligence in this unit helps predict a remote device's future problems and end-of-life based on diagnostic data, health status, and other relevant reports gathered from the remote device by a servicing UAV.

As discussed, DARLING can use machine learning algorithms, such as Big-Little Deep Neural Network (BL-DNN) 90, for predictive maintenance. This type of neural network algorithm contains two Neural Network architectures implemented in two different hardware units with differing power and computing capabilities. The Big DNN 90 trains a large Deep Neural Network based on the collected information to predict the issues and is implemented on the AI predictive maintenance unit 78 of the base station 10 where the processing and power resources are more readily available. On the other hand, the edge AI unit takes a smaller version of the trained model from the base station's AI Predictive Maintenance Unit and is implemented on the edge AI computing unit 86 of the UAV 20 to determine how much diagnostic information must the UAV 20 collect from the remote device 30 if the base station 10 predicts a known problem or unknown faults in its system. Other machine learning algorithms may be substituted for this predictive maintenance scheme in order to meet power and computing constraints of the base station 10 and the UAVs 20.

The AI predictive maintenance unit 78 in the base station 10 receives information from the device database 72, which contains collected diagnostic information about all the remote devices 30 that the system services. As mentioned previously, the Big DNN 90 or other predictive models is a significant portion of this unit which looks to confirm and expand on issues detected by the Small DNN or other edge AI units. The AI predictive maintenance unit 78 may also consider weather and other environmental information at the location of each remote device 30 to make its prediction, especially when to deploy a fix back on the field, and may use this information to figure out when to decommission and return a remote device 30 back to the base station 10 when the remote device 30 reaches its end-of-life. After a future issue is determined, the AI predictive maintenance unit can create a patch, fix, or upgrade to be released on the remote device 30 and others of its type to prevent anticipated problem. For these future issues, this fix can be rolled out on a schedule based on the severity of the issue (ranging from immediately onto the next scheduled maintenance time given weather conditions).

If the UAV 20 predicts or discovers an issue on the remote device 30 before performing maintenance, the UAV can perform targeted maintenance on the remote device 30. Thus, targeted maintenance performs immediate servicing of a remote device 30 when a UAV 20 detects unexpected faults or errors on that device or those nearby. When the UAV's edge AI unit detects an issue, such as battery or storage failure and other problems, the UAV 20 immediately collects more diagnostic information from the remote device 30 and leaves for the base station 10 to unload its prediction along with collected data. Unlike in predictive maintenance, the time frame for targeted maintenance is much shorter and often requires immediate action. However, it will use the same AI model in the base station 10 to confirm an issue detected on the remote device 30 by the UAV 20. When a problem is encountered on one remote device 30, a patch can be made quickly using the a service solution unit 76 of the base station unit. An immediate patch or solution rollout to other remote devices 30 of the same type occurs if the issue is determined to be severe and requires immediate action.

Finding these imminent issues may also come from nearby remote devices 30 of the one being serviced at the current instance. The wireless transmitters and receivers on the UAVs 20 and remote devices 30 are important for relaying messages of the issues amongst devices on this "maintenance network" of UAVs 20 and remote devices 30.

Figure 17:
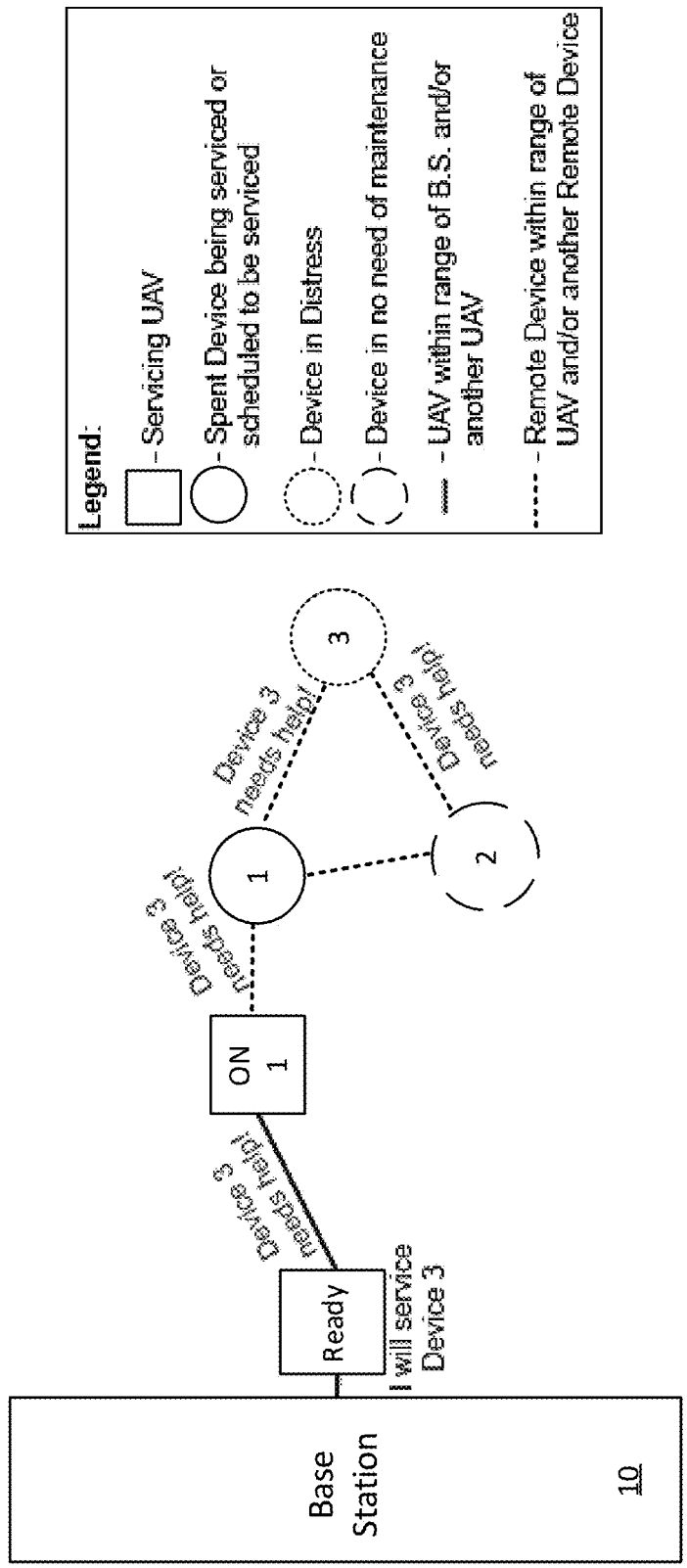
FIG. 17 shows an exemplary message passing scheme on a DARLING maintenance network in accordance with various embodiments of the present disclosure.

FIG. 17 highlights an exemplary message passing scheme among remote devices 30 and UAVs 20 in the maintenance network, in accordance with various embodiments. The scheme is most effective when remote devices 30 have wireless communication capabilities to relay their distress signals to others around them. An unoccupied and unspent UAV 20, whether it finishes its servicing schedule or sitting in the base station 10, can acknowledge these distress signals and will immediately navigate to the general area of this device if stored in its memory. In FIG. 17, Remote Device 3 broadcasts a distress signal to Remote Devices 1 and 2, but only Device 1 passes this message along to other components in the maintenance network, specifically the UAV servicing it. Since no UAV is servicing Device 2, this remote device has no means of continuing to pass along the Device 3's distress message. Subsequently, this servicing UAV passes Device 3's distress message to a UAV sitting in the base station 10 which acknowledges the signal and prepares to navigate to Device 3.

Figure 18:
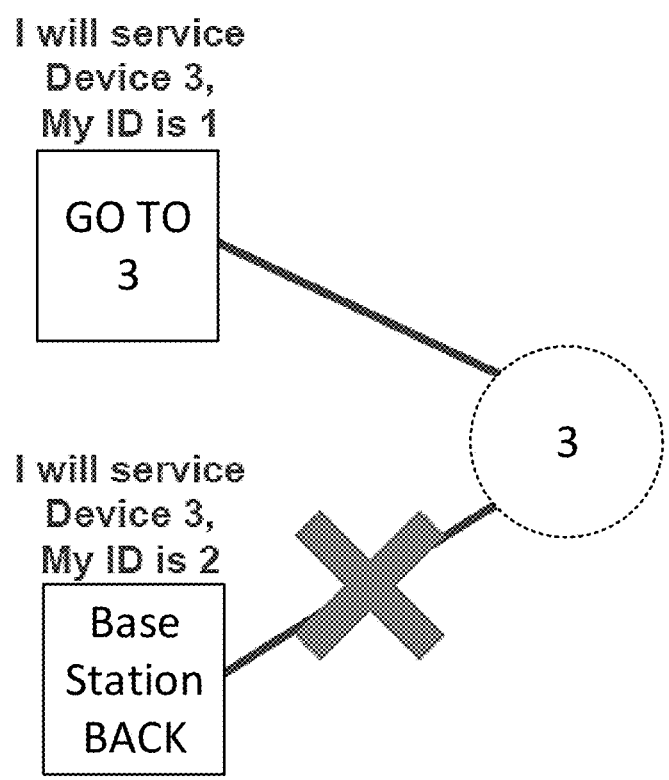
FIG. 18 shows a diagram representation of an exemplary rule for determining which UAV will service a distressed remote device based on an identification (ID) number in accordance with various embodiments of the present disclosure.
Figure 19:
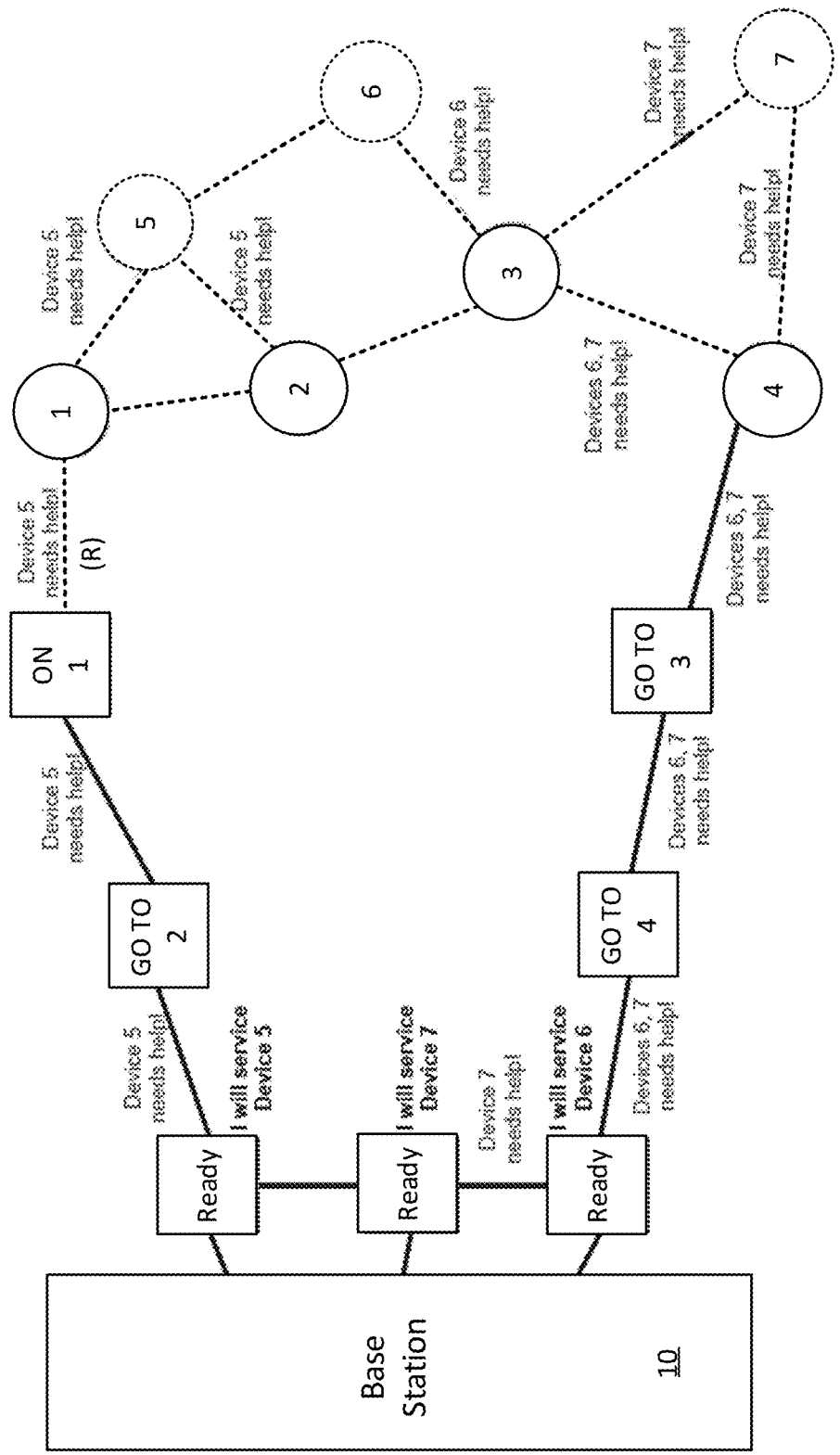
FIG. 19 shows a diagram representation of a process of relaying of distress signals by UAVs to the base station and the deployment of available UAVs to respond to the distress signals by the base station in accordance with various embodiments of the present disclosure.
Figure 20:
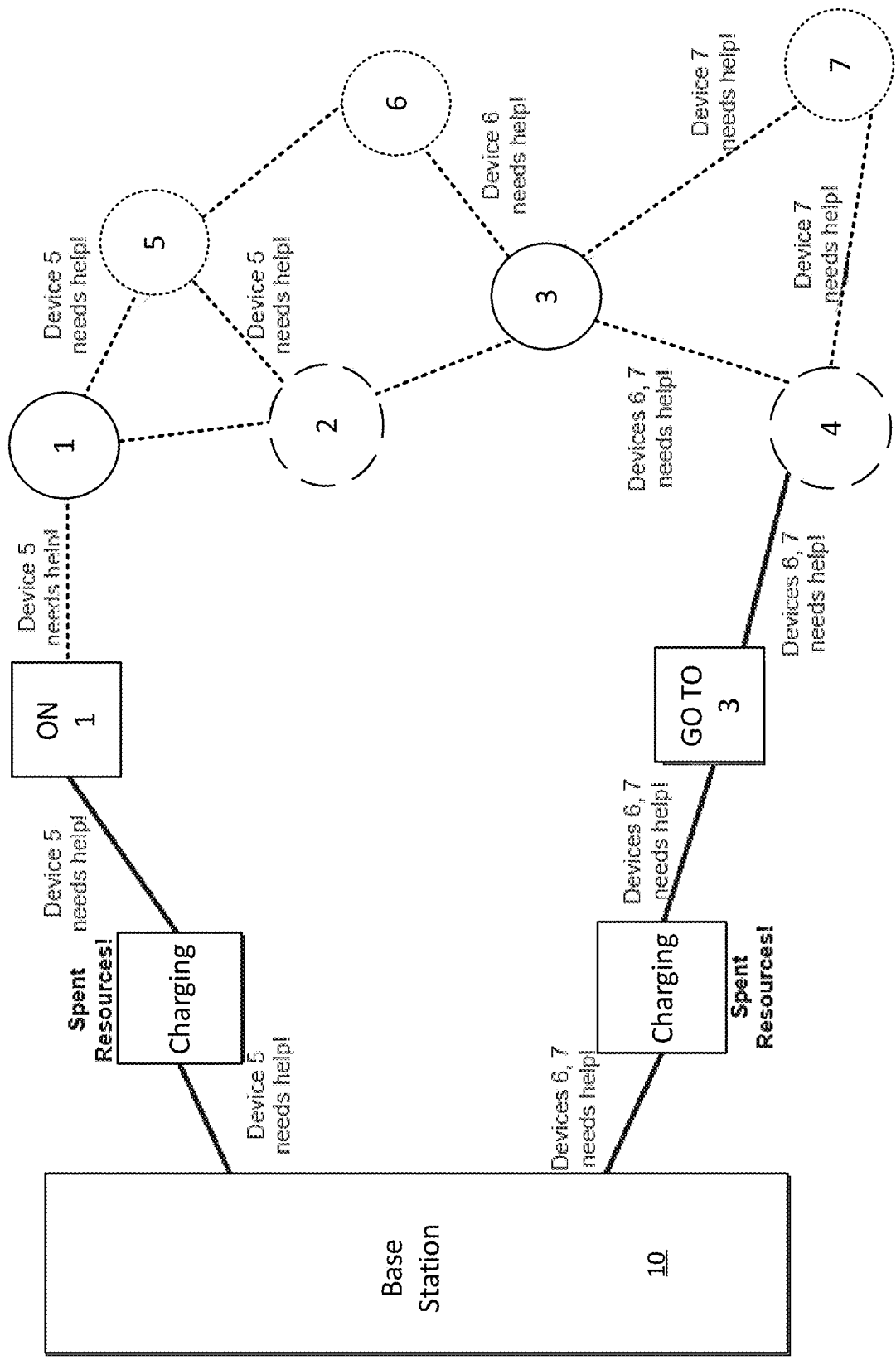
FIGS. 20-21 show diagram representations of a process of relaying of distress signals by UAVs to the base station and waiting for deployment of a first available UAV to respond to the distress signals by the base station in accordance with various embodiments of the present disclosure.
Figure 21:
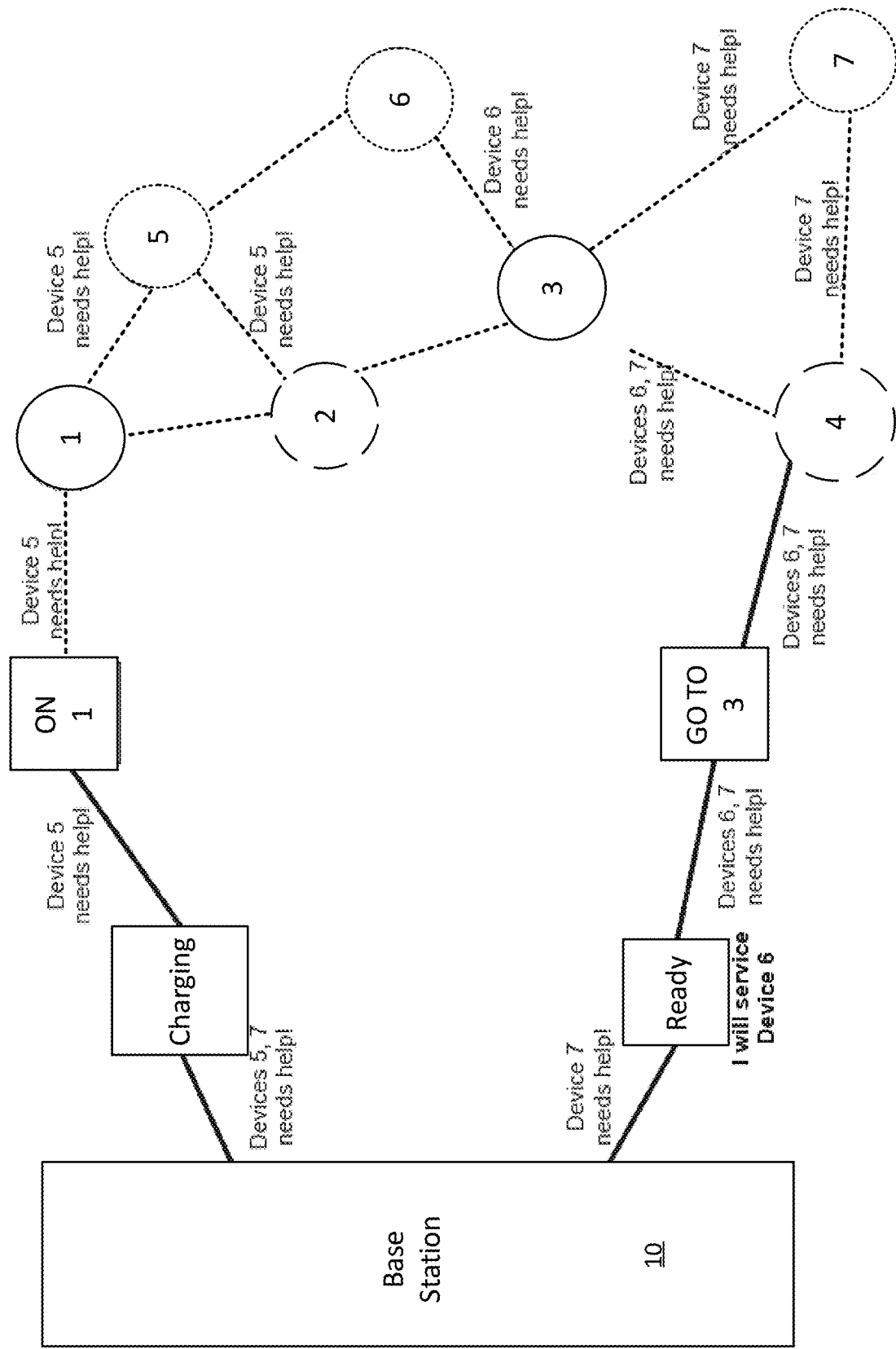

Further extensions to this message passing scheme can be implemented in various embodiments. For example, if two or more UAVs 20 arrives at the area of the distressed remote device 30, a predetermined rule can kick in to resolve which UAV 20 will service the remote device 30. Some possible rules include having the UAV with the smallest ID number (a simple rule), as shown in FIG. 18, or the UAV with the most resources (requires some processing among the UAVs) service the affected remote device. If no UAVs 20 are available due to them being occupied or spent (e.g., having no maintenance resources left), the UAVs 20 can relay the distress signals all the way to the base station 10. If, at that instance, there are free and replenished UAVs 20, the base station 10 can deploy them right away, as shown in FIG. 19. Otherwise, as shown in FIG. 20, the first UAV to become replenished can service the distressed device, as shown in FIG. 21.

As discussed, in various embodiments, DARLING can be applied to multiple use cases and applications, including but not limited to: 1) Remote Resource Monitoring and 2) Home Automation. Moreover, the choice of authentication mechanism also affects the hardware overhead of the UAV 20, which plays a role in each of the use cases. For the sake of simplicity, the figures for each use case follow the general architecture of the DARLING framework as laid out in FIG. 2 with some minor modifications on the remote device side.

Figure 22:
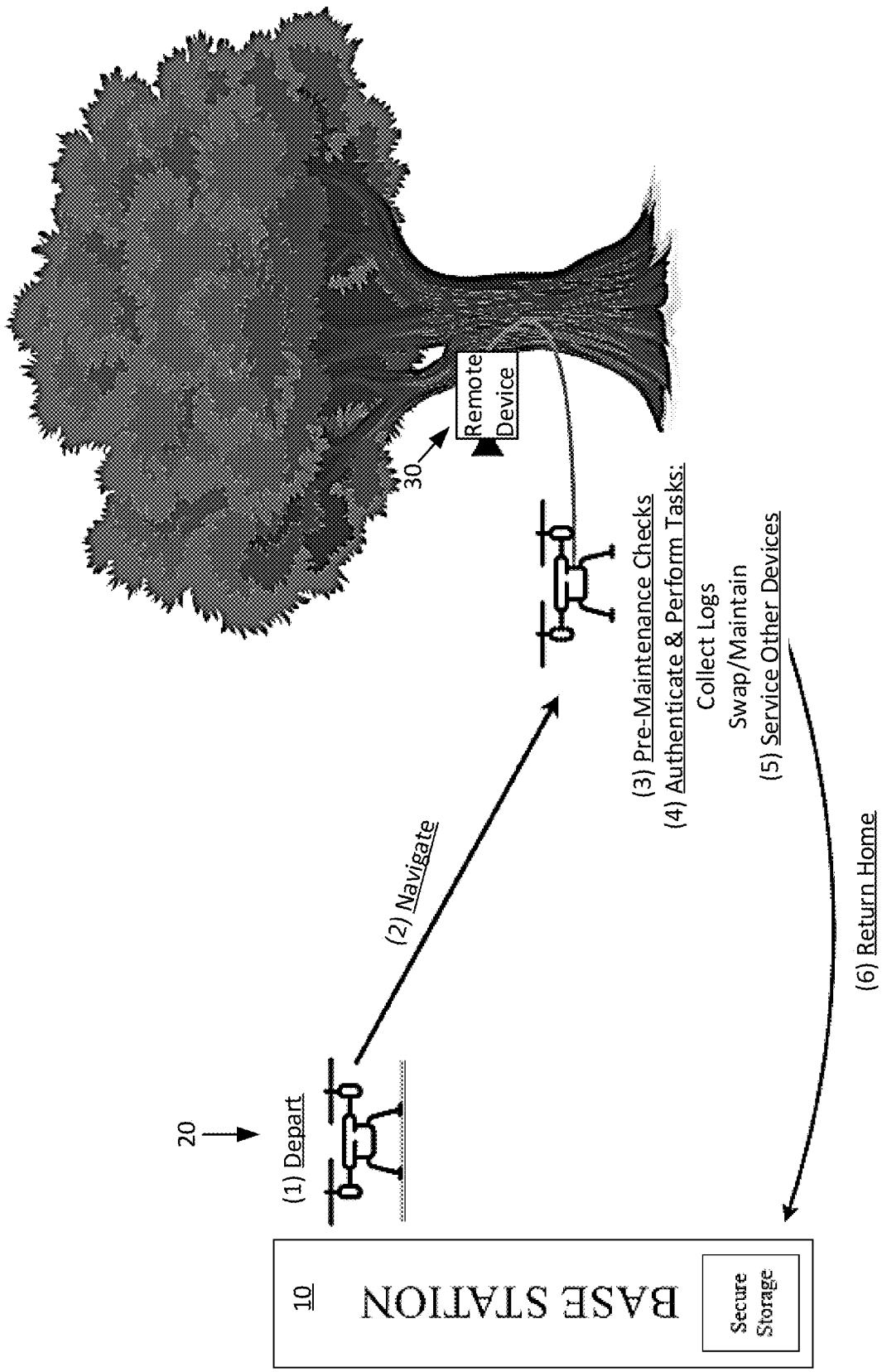
FIG. 22 shows a diagram representation of a use case for remote resource monitoring utilizing an exemplary DARLING system in accordance with various embodiments of the present disclosure.

FIG. 22 illustrates the use case for remote resource monitoring-related applications. For this use case, the base station 10 can be located in a building, such as a warehouse or a fire/ranger station, which is a considerable distance away from the remote device 30. The remote device 30 refers to a remotely located device that is battery operated and with no Internet connection. Based on the criticality of the information collected at the remote device, the base station 10 can include a secure storage where the UAV 20 can store the retrieved data. The UAV 20 can be equipped with standard UAV equipment (as discussed in connection with FIGS. 4 and 8). After landing and connecting to the device 30, the UAV 20 and the remote device 30 can perform their own authentication routine to ensure they are supposed to communicate with each other. The UAV 20 may then download the remote device's logs onto its internal storage. Accordingly, the UAV 20 can perform the necessary maintenance tasks, e.g., swapping/charging the batteries, transferring the remote device's sensor data onto the UAV's storage, and freeing up storage space on the device 30.

Besides the charging and data retrieval tasks, the DARLING framework allows for other types of repairs to be performed on the remote device 30. The UAV 20 can also detect tampering of the remote device based on the inconsistencies during the authentication process or by the UAV 20 looking at status signals on the device logs. The UAV 20 can cease the maintenance operation for this tampered device and return to the base station 10 to report it. People at the base station 10 can then decide on what to do with the remote device 30, for example, sending a UAV 20 to retrieve the remote device 30. Moreover, as the UAV 20 gathers the device logs during regular maintenance procedure, a determination of other repair tasks may be made on the base station 10 based on these logs when the UAV 20 returns home. For example, the UAV 20 may trace a software bug when collecting device logs. The people at the base station 10 can remotely debug this issue and then send out a UAV 20 with the appropriate repair mechanism to service the affected device 30. Such repairs not only supplements the regular maintenance offered by DARLING but also ensure the upkeep of the remote device 30 for longer operation times with a reduction in service interruption.

Figure 23:
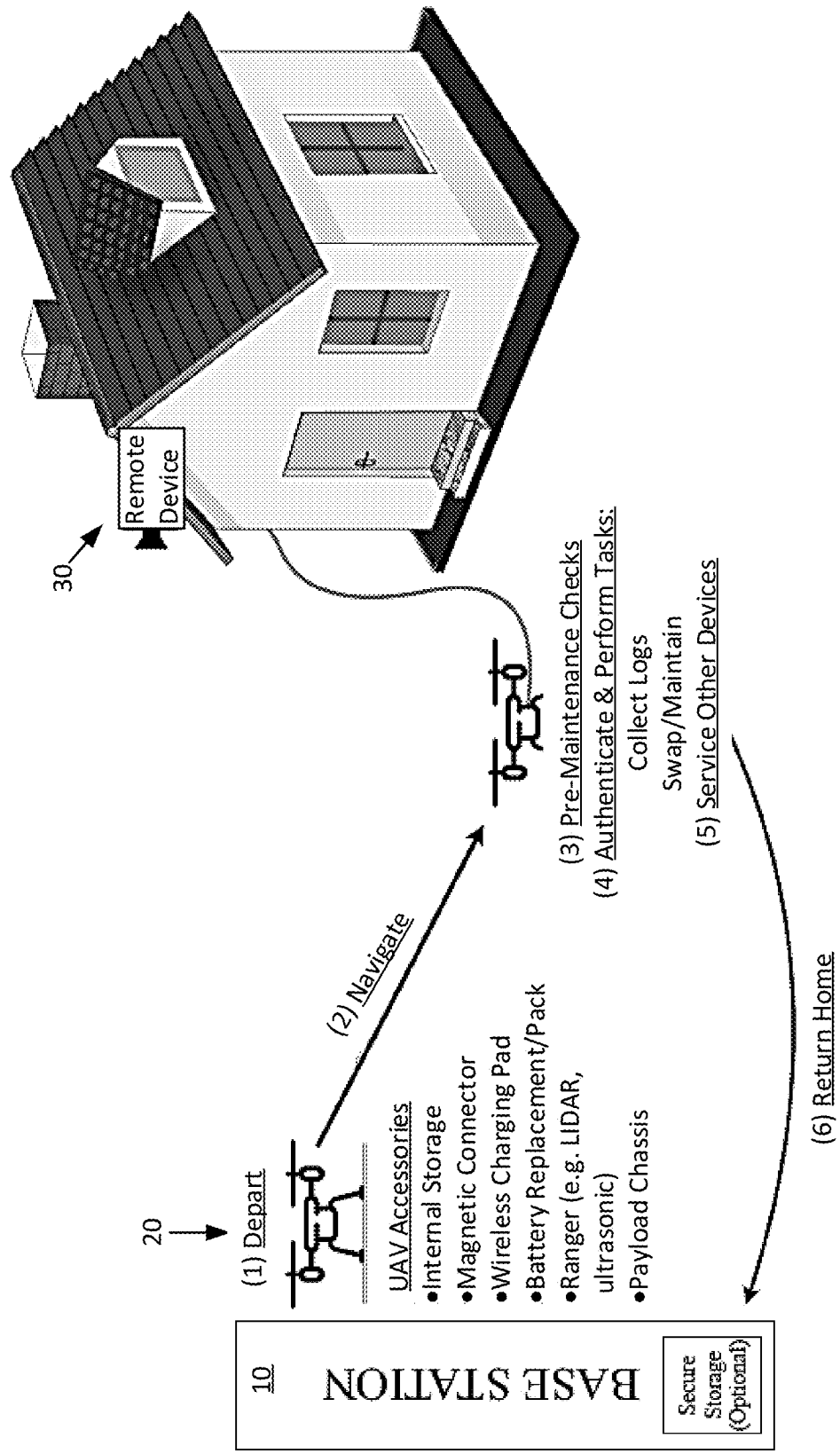
FIG. 23 shows a diagram representation of a use case for home automation servicing utilizing an exemplary DARLING system in accordance with various embodiments of the present disclosure.

Another application or use case of DARLING is maintaining Internet-of-Things (IoT) smart connected devices at home, as shown in FIG. 23. Similar to the remote resource monitoring application, the remote devices 30 may be battery-operated devices but placed at an inconvenient location in a home for maintenance, such as a roof, attic, gutter, etc. Such devices are typically part of a home security product, such as security cameras, motion sensors, and glass break sensors. The location and portability of these remote devices 30 often make them inaccessible to the power outlet without needing a long extension cord as well as them being only battery-operated. For this use case, the base station 10 can sit at a residence or at a repair station hub. Unlike the remote resource monitoring application, it is assumed that Internet connection is available to each remote device 30. Subsequently, battery charging becomes the most paramount task for the UAVs 20 in this application. As laid out in the DARLING general architecture, the base station 10 can instruct the UAVs 20 on which device(s) 30 to service, and these UAVs 20 can then launch to their respective remote device 30. After landing on the device 30, both the UAV 20 and the remote device 30 can authenticate either using their onboard authentication unit or using the Internet connection available; both these systems can utilize network-level authentication. In various embodiments, the choice of the authentication protocols will be determined at the base station 10 before the UAV 20 takes off to its assigned device 30. After validating their communication, the UAV 20 can then perform the regular maintenance procedure of retrieving system logs and charging the battery. If the remote device 30 is connected to the Internet, especially at the base station 10, it can be assumed that the data transfer protocol has been established. Therefore, the UAV 20 need not collect sensor data during its regular maintenance procedure. Moreover, the base station 10 can maintain a record of which remote device 30 is Internet-connected. Therefore, only the remote devices 30 which are not connected to the Internet will have the UAV 20 retrieve the data and free up their storage as part of its regular maintenance procedure.

Additionally, other use cases are also contemplated in various embodiments, such as monitoring of a health of a patient in a remote location using the DARLING framework. Today, the doctor-to-patient ratio in rural locations is 13.1 per 10,000 people. This means that a lot of the patients have to travel quite some distance for access to quality healthcare. This may be mitigated by using the UAV 20 to perform periodic checks on the patient, in which the UAV 20 is equipped with capabilities to collect diagnostic information and allows the patient to interact with a specialist located elsewhere. The use of UAVs 20 in this scenario can improve the quality of life of the patient significantly and can improve the healthcare coverage quite significantly. For example, in a healthcare application, the target or remote entity can be a patient or medical equipment 30 for patient in a remote village that is far away from the nearest hospital or clinic. Similar to the other applications, DARLING can help in monitoring healthcare implant devices 30 that are on the patient, but it can also bridge the communication between medical personnel from the faraway clinic to the patient so that personnel can check up on the patient routinely.

It may be that the patient's location has Internet connection, in which case, non-invasive procedures can be performed by this system which include replacing batteries/parts on medical devices 30, performing routine medical checkups, following up on patients after a hospital procedure, and delivering medicine. Some of the UAV equipment, especially the DCU, may not be necessary unlike the other use cases. The UAV 20 in this instance can be equipped with a portable vital sign test suite and replacement parts for the patient's medical device, if any. Besides these parts, the UAV 20 can also be equipped with a microphone, camera, and some authentication platform (e.g., keypad) to validate the patient when the UAV 20 arrives at the pre-programmed location. Moreover, these sensors can help establish a two-way communication between a medical professional from the base station 10 and the patient using the Internet connection, if available. To collect logs for this use case, the UAV 20 can collect vital signs and other readily available medical data from the patient or the patient's medical devices 30 (e.g., remote devices). The data can then be sent to the medical personnel at the base station 10 either right away if an emergency arise or when the UAV returns to the base station 10 after a routine check. While the UAV 20 can be self-guiding for navigation tasks, individual confirmation from the base station 10 for maintenance tasks is required for medical-related maintenance tasks, in various embodiments. In terms of authentication, the use of a local key exchange aided with the use of a keypad for the patient to enter a pre-programmed password can be implemented in various embodiments. If an Internet connection is available, the cloud-based authentication mechanism can also be deployed as an alternative if the patient is incapable of entering a password manually.

It should be emphasized that the above-described embodiments are merely possible examples of implementations, merely set forth for a clear understanding of the principles of the present disclosure. Many variations and modifications may be made to the above-described embodiment(s) without departing substantially from the principles of the present disclosure. All such modifications and variations are intended to be included herein within the scope of this disclosure.

The invention claimed is:

1. A method comprising:
deploying, from a base station, an unmanned aerial vehicle from a group of unmanned aerial vehicles, wherein the base station assigns a maintenance order to the unmanned aerial vehicle for servicing of a remote device, wherein the maintenance order includes a location for the remote device;
traveling, by the unmanned aerial vehicle, to the location of the remote device, wherein the unmanned aerial vehicle self-navigates to the location of the remote device;
authenticating, by the unmanned aerial vehicle, a valid identification of the remote device;
upon the remote device being authenticated by the unmanned aerial vehicle, servicing the remote device by at least charging a power supply of the remote device and transferring contents of a device log to the unmanned aerial vehicle;
predicting, by the unmanned aerial vehicle using an artificial intelligence model, that the transferred device log shows that remote device has a maintenance issue that is not currently scheduled to be serviced by the base station;

servicing, by the unmanned aerial vehicle, the maintenance issue before returning to the base station; and
after completing the servicing of the remote device, returning to the base station and transferring contents of the device log to the base station.

2. The method of claim 1, further comprising after returning to the base station, charging a power supply of the unmanned aerial vehicle.

3. The method of claim 1, wherein the unmanned aerial vehicle is equipped with a camera, the method further comprising using the camera to gather information on the remote device and identify a maintenance configuration for accessing a charge port and a device log port of the remote device to enable charging of the power supply from the unmanned aerial vehicle and transferring of the device log of the remote device.

4. The method of claim 1, wherein the unmanned aerial vehicle is equipped with a camera and a robotic arm, the method further comprising using the camera to gather information on the remote device and identify a maintenance configuration for accessing a swappable battery and a swappable memory card containing the device log, wherein the unmanned aerial vehicle utilizes the robotic arm to physically swap out the swappable battery with a replacement battery and the swappable memory card with a replacement memory card on the remote device.

5. The method of claim 4, further comprising:
assessing, by the unmanned aerial vehicle, whether it is safe to land near the remote device; and
if the unmanned aerial vehicle determines that it is not safe to land near the remote device, detaching a maintenance platform that is secured to a terrain next to the remote device using the robotic arm, wherein the maintenance platform carries a power source for charging or replacing the power source of the remote device and a data transfer storage medium for storing the contents of the device log, wherein the maintenance platform is configured to carry out servicing of the remote device while the unmanned aerial vehicle returns to the base station or services another remote device.

6. The method of claim 1, further comprising before servicing the remote device, performing, by the unmanned aerial vehicle, a pre-maintenance routine to check a health of the remote device.

7. The method of claim 1, wherein the remote device authenticates an identification of the unmanned aerial vehicle to be valid before allowing a transfer of the device log to the unmanned aerial vehicle.

8. The method of claim 1, further comprising predicting, by the base station using an artificial intelligence model, a maintenance issue involving the remote device based on a plurality of device logs returned from a plurality of unmanned aerial vehicles that service a plurality of remote devices.

9. The method of claim 8, wherein the unmanned aerial vehicle and the base station collectively utilize an artificial intelligence for modeling.

10. The method of claim 8, wherein the base station authenticates an identification of the unmanned aerial vehicle to be valid before allowing a transfer of the device log from the unmanned aerial vehicle to the base station.

11. The method of claim 1, wherein the remote device comprises a home automation device, a security device, a sensor device, or a medical device.

12. The method of claim 1, further comprising:
detecting, by the unmanned aerial vehicle, a distress signal issued by a different remote device that is not being serviced by the unmanned aerial vehicle; and
relaying, by the unmanned aerial vehicle, the distress signal to another unmanned aerial vehicle, another remote device, or the base station, wherein the distress signal is relayed until the distress signal is transmitted to the base station.

13. A system comprising:
a base station; and
an unmanned aerial vehicle configured to:
receive a maintenance order for servicing of a remote device from the base station, wherein the maintenance order includes a location for the remote device;
travel to the location of the remote device, wherein the unmanned aerial vehicle self-navigates to the location of the remote device;
authenticate a valid identification of the remote device;
upon the remote device being authenticated by the unmanned aerial vehicle, service the remote device by at least charging a power supply of the remote device and transferring contents from a device, including its log, to the unmanned aerial vehicle; and
after completing the servicing of the remote device, return to the base station and transfer contents from a device, including its log, to the base station,
wherein the unmanned aerial vehicle is configured to predict, using an artificial intelligence model, that the transferred device log show that remote device has a maintenance issue that is not currently scheduled to be serviced by the base station.

14. The system of claim 13, wherein the unmanned aerial vehicle is equipped with a camera, wherein the unmanned aerial vehicle is configured to gather information on the remote device using the camera and identify a maintenance configuration for accessing a charge port and a device log port of the remote device to enable charging of the power supply from the unmanned aerial vehicle and transferring of the device log of the remote device.

15. The system of claim 13, wherein the unmanned aerial vehicle is equipped with a camera and a robotic arm, wherein the unmanned aerial vehicle is configured to gather information on the remote device using the camera and identify a maintenance configuration for accessing a swappable battery and a swappable memory card containing the device log, wherein the unmanned aerial vehicle is configured to connect a maintenance platform carrying a replacement battery and a replacement memory card to the remote device and utilize the robotic arm to physically swap out the swappable battery with the replacement battery and the swappable memory card with the replacement memory card on the remote device.

16. The system of claim 13, wherein the base station is configured to predict, using an artificial intelligence model, a maintenance issue involving the remote device based on a plurality of device logs returned from a plurality of unmanned aerial vehicles that service a plurality of remote devices, wherein the plurality of unmanned aerial vehicles comprise the unmanned aerial vehicle.

17. The system of claim 16, wherein the base station is configured to authenticate an identification of the unmanned aerial vehicle to be valid before allowing a transfer of the device log from the unmanned aerial vehicle to the base station.

18. The system of claim 13, wherein the unmanned aerial vehicle is configured to detect a distress signal issued by a different remote device that is not being serviced by the unmanned aerial vehicle and is configured to relay the distress signal to another unmanned aerial vehicle, another remote device, or the base station, wherein the distress signal is relayed until the distress signal is transmitted to the base station.

19. A method comprising:
deploying, from a base station, an unmanned aerial vehicle from a group of unmanned aerial vehicles, wherein the base station assigns a maintenance order to the unmanned aerial vehicle for servicing of a remote device, wherein the maintenance order includes a location for the remote device, wherein the unmanned aerial vehicle is equipped with a camera and a robotic arm;
traveling, by the unmanned aerial vehicle, to the location of the remote device, wherein the unmanned aerial vehicle self-navigates to the location of the remote device;
assessing, by the unmanned aerial vehicle, whether it is safe to land near the remote device;
if the unmanned aerial vehicle determines that it is not safe to land near the remote device, detaching a maintenance platform that is secured to a terrain next to the remote device using the robotic arm, wherein the maintenance platform carries a power source for charging or replacing the power source of the remote device and a data transfer storage medium for storing contents of a device log, wherein the maintenance platform is configured to carry out servicing of the remote device while the unmanned aerial vehicle returns to the base station or services another remote device;
authenticating, by the unmanned aerial vehicle, a valid identification of the remote device;
upon the remote device being authenticated by the unmanned aerial vehicle, servicing the remote device by at least charging a power supply of the remote device and transferring contents of the device log to the unmanned aerial vehicle;
using the camera to gather information on the remote device and identify a maintenance configuration for accessing a swappable battery and a swappable memory card containing the device log, wherein the unmanned aerial vehicle utilizes the robotic arm to physically swap out the swappable battery with a replacement battery and the swappable memory card with a replacement memory card on the remote device; and
after completing the servicing of the remote device, returning to the base station and transferring contents of the device log to the base station.

20. The method of claim 19, further comprising:
detecting, by the unmanned aerial vehicle, a distress signal issued by a different remote device that is not being serviced by the unmanned aerial vehicle; and
relaying, by the unmanned aerial vehicle, the distress signal to another unmanned aerial vehicle, another remote device, or the base station, wherein the distress signal is relayed until the distress signal is transmitted to the base station.

\* \* \* \* \*